US012731618B2

(12) United States Patent
Gossain

(10) Patent No.: US 12,731,618 B2
(45) Date of Patent: Sep. 8, 2026

(54) AUDIO CACHING FOR SYNCHRONOUS PLAYBACK

(71) Applicant: Sonos, Inc., Santa Barbara, CA (US)

(72) Inventor: Hrishikesh Gossain, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 289 days.

(21) Appl. No.: 18/188,515

(22) Filed: Mar. 23, 2023

(65) Prior Publication Data

US 2023/0317118 A1 Oct. 5, 2023

Related U.S. Application Data

(60) Provisional application No. 63/325,937, filed on Mar. 31, 2022.

(51) Int. Cl.

| | |
|---|---|
| ***H04R 27/00*** | (2006.01) |
| ***G06F 3/16*** | (2006.01) |
| ***G11B 27/10*** | (2006.01) |
| ***H04R 3/12*** | (2006.01) |
| *H04R 5/02* | (2006.01) |
| *H04S 3/00* | (2006.01) |

(52) U.S. Cl.

CPC ............ *G11B 27/102* (2013.01); *G06F 3/162* (2013.01); *G06F 3/165* (2013.01); *H04R 3/12* (2013.01); *H04R 27/00* (2013.01); *H04R 5/02* (2013.01); *H04R 2227/005* (2013.01); *H04R 2420/07* (2013.01); *H04S 3/008* (2013.01); *H04S 2400/01* (2013.01)

(58) Field of Classification Search

CPC .... H04R 27/00; H04R 3/12; H04R 2227/005; H04R 2420/07; H04R 5/02; G06F 3/165

USPC .............................................. 381/77, 80, 82

See application file for complete search history.

(56) References Cited

U.S. PATENT DOCUMENTS 5,440,644 A 8/1995 Farinelli et al.
5,761,320 A 6/1998 Farinelli et al.

(Continued)

FOREIGN PATENT DOCUMENTS

EP 1389853 A1 2/2004
WO 200153994 7/2001
WO 2003093950 A2 11/2003

OTHER PUBLICATIONS

AudioTron Quick Start Guide, Version 1.0, Mar. 2001, 24 pages.

(Continued)

*Primary Examiner* — Disler Paul
(74) *Attorney, Agent, or Firm* — Akerman LLP

(57) ABSTRACT

Disclosed embodiments include a playback device configured to: (i) maintain a cache comprising a plurality of tracks, wherein an individual track comprises a series of frames, and an individual frame comprises a portion of audio; (ii) after receiving a request to play a particular track, determining whether the particular track is in the cache at the playback device; (iii) when the particular track is in the cache at the playback device, (a) identify playback timing for each frame of the series of frames stored in the cache based at least in part on a current clock time of a clock at the playback device, and (b) play individual frames in the series of frames according to the playback timing for the individual frames; and (iv) when the particular track is not in the cache, obtain the particular track from an audio information source.

17 Claims, 18 Drawing Sheets

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 9,727,303 | B2 * | 8/2017 | Millington | G06F 16/2322 |
| 11,438,688 | B2 * | 9/2022 | Jorgovanovic | H04R 1/1041 |
| 11,653,053 | B2 * | 5/2023 | Gharaat | H04N 21/435<br>707/E17.014 |
| 11,876,847 | B2 * | 1/2024 | McKenzie | H04N 21/43615 |
| 11,900,010 | B2 * | 2/2024 | Berger | H04N 21/4305 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *DM Holdings* (No. 14-1330-RGA), DI 219, Claim Construction Opinion (Jan. 12, 2017) (24 pages).

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2006, entitled "Controlling and manipulating groupings in a multi-zone music or media system," 82 pages.

JPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

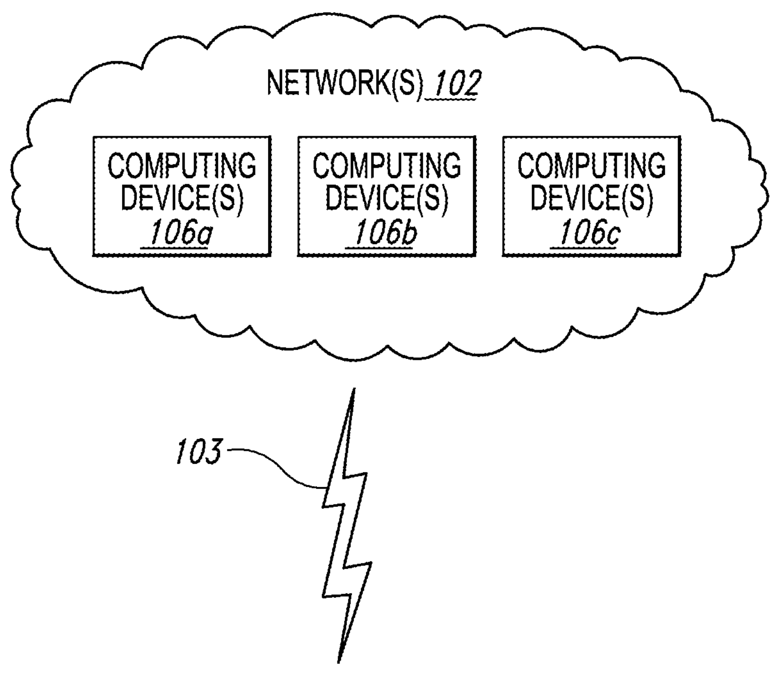
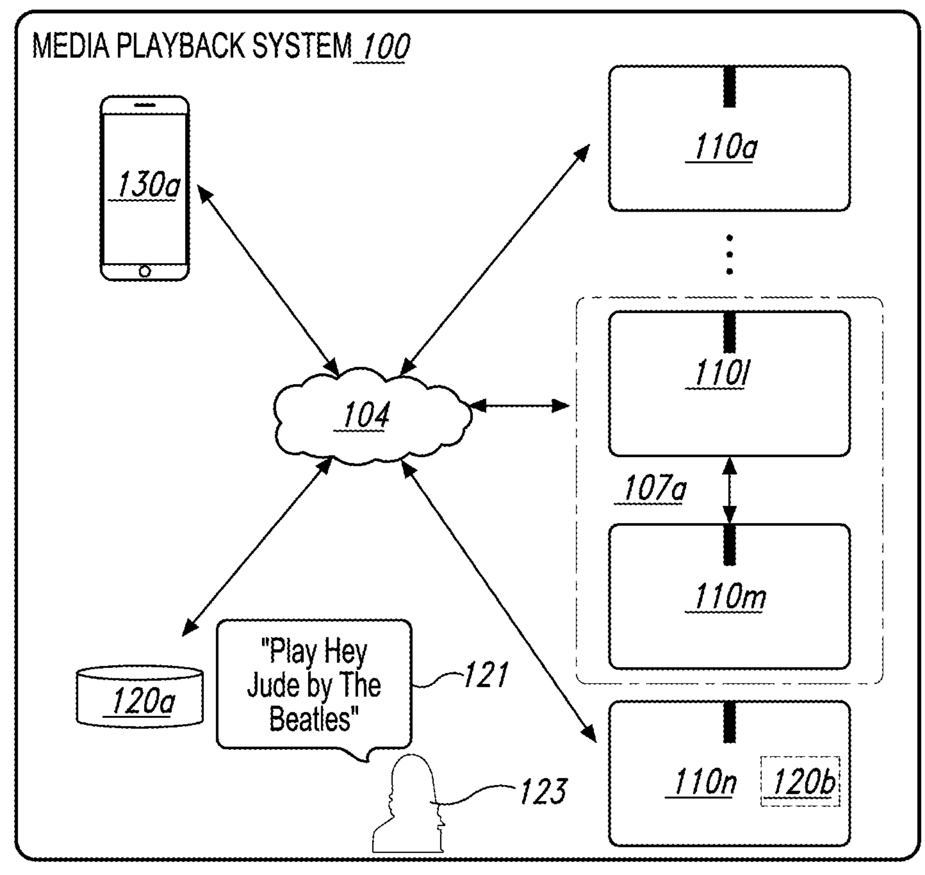
*Fig. 1B*

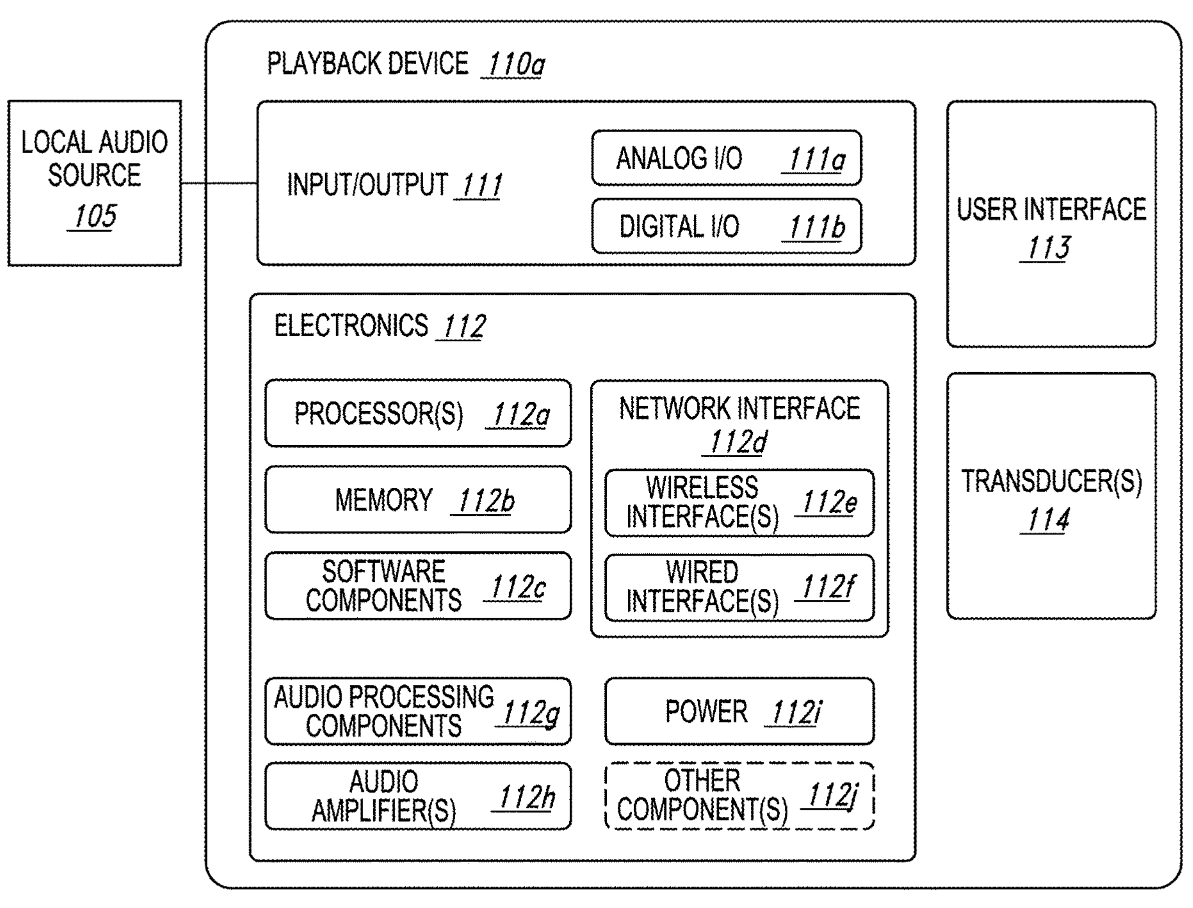
*Fig. 1C*
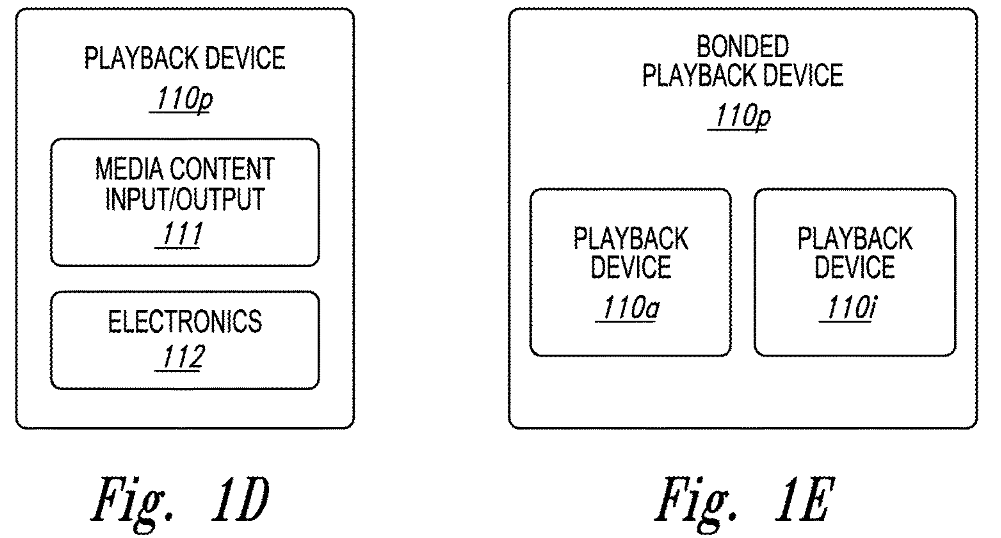
*Fig. 1D*
*Fig. 1E*

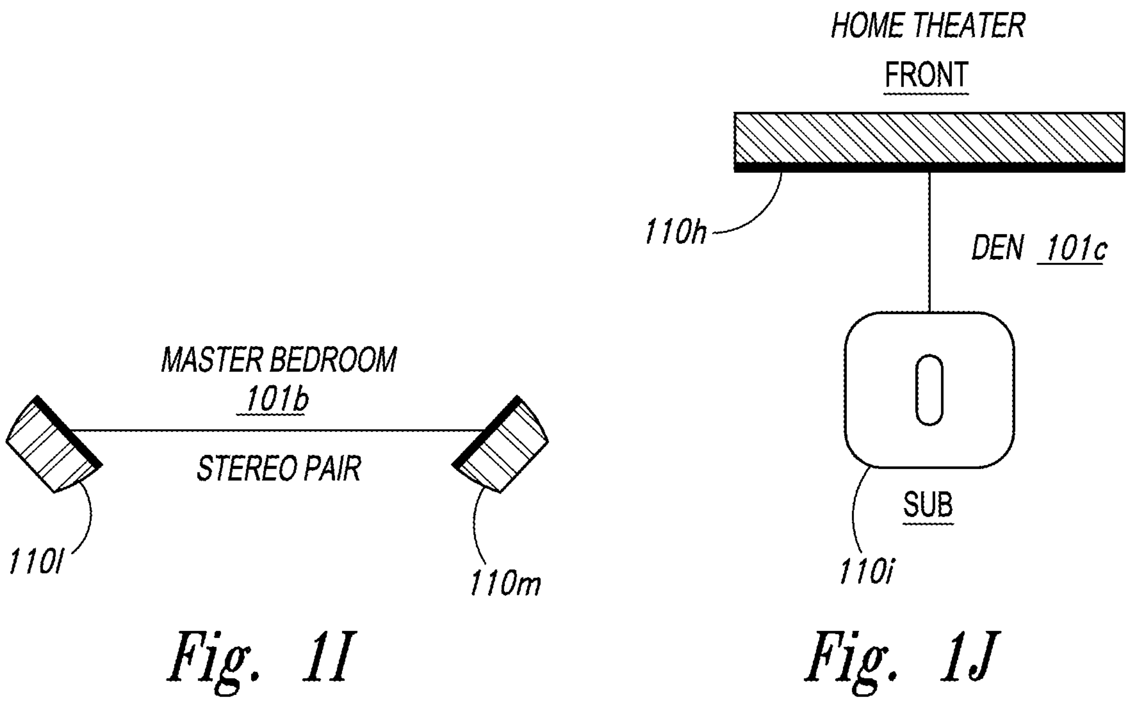
Fig. 1I
Fig. 1J
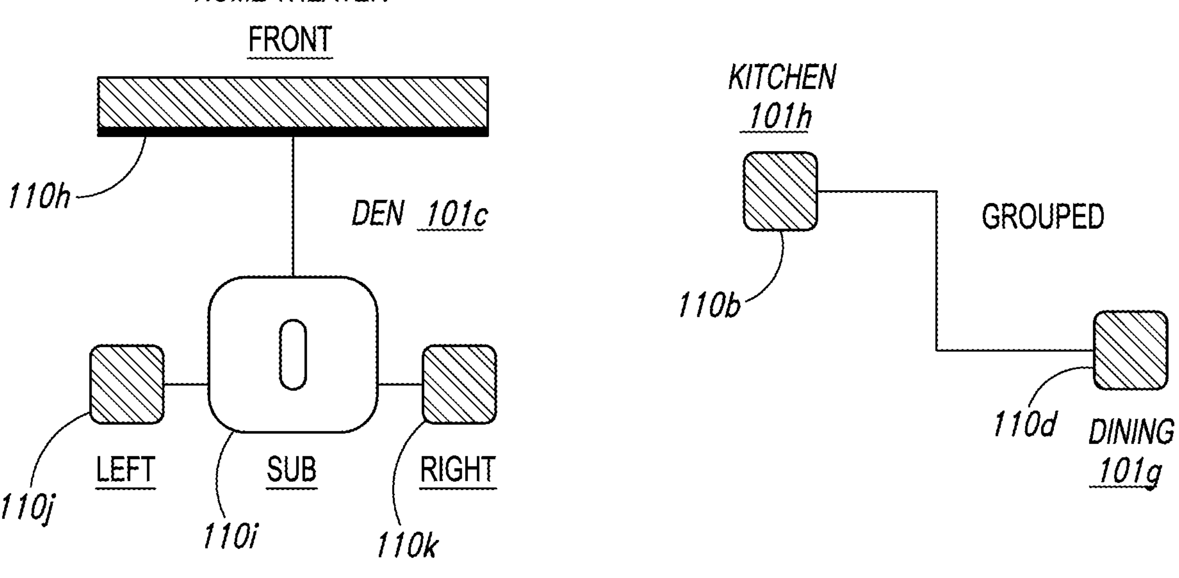
Fig. 1K
Fig. 1L 320
313
316a
SONOS
316c 316
316b 320
316d
313
SONOS
316a
316c 316b

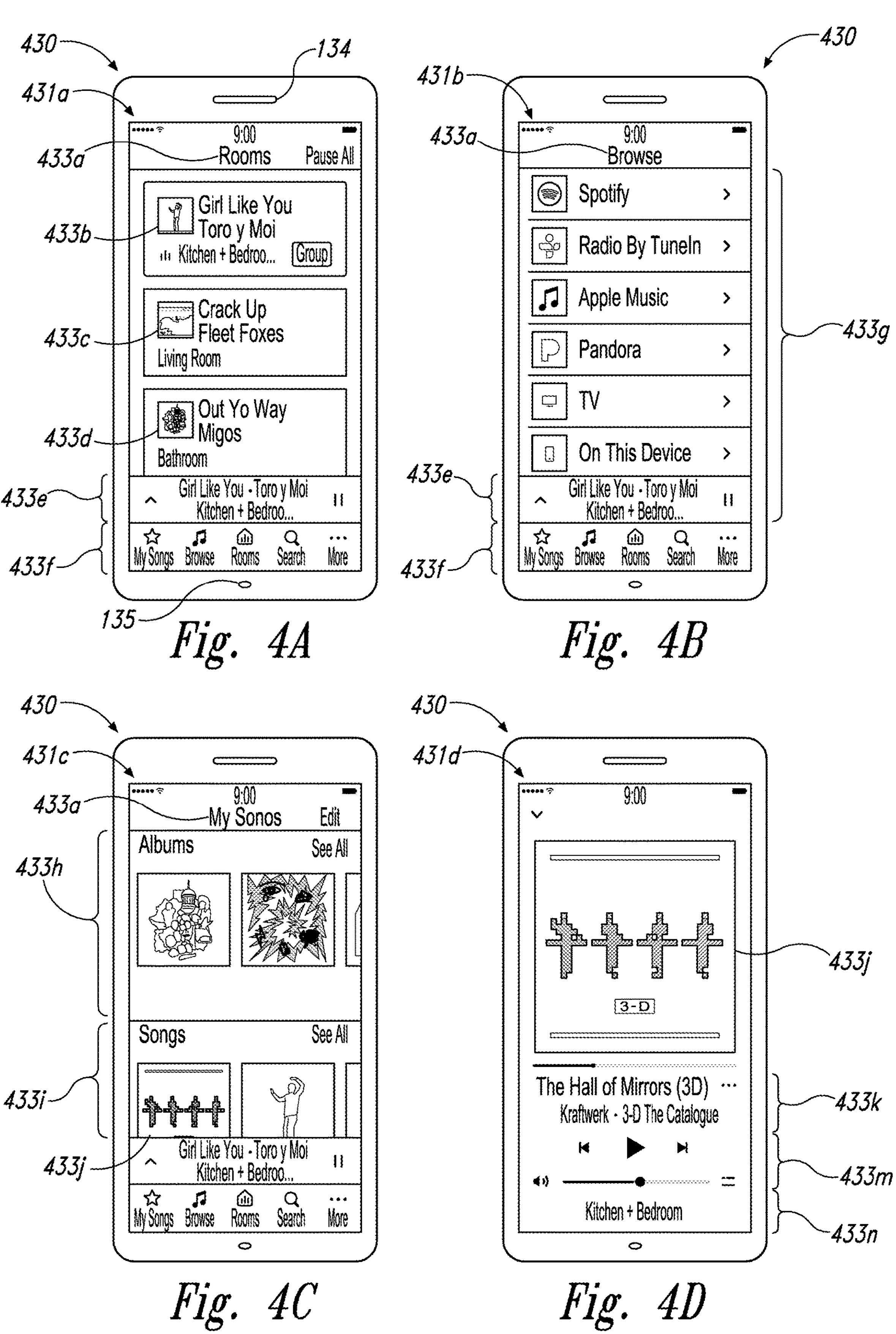
430
134
431a
433a
Rooms
Pause All
9:00
433b
Girl Like You
Toro y Moi
Kitchen + Bedroo...
Group
433c
Crack Up
Fleet Foxes
Living Room
433d
Out Yo Way
Migos
Bathroom
433e
Girl Like You - Toro y Moi
Kitchen + Bedroo...
433f
My Songs
Browse
Rooms
Search
More
135
Fig. 4A
430
431b
433a
Browse
Spotify
Radio By TuneIn
Apple Music
Pandora
TV
On This Device
433g
433e
433f
Fig. 4B
430
431c
433a
My Sonos
Edit
Albums
See All
433h
Songs
433i
433j
Fig. 4C
430
431d
433j
3-D
The Hall of Mirrors (3D)
Kraftwerk - 3-D The Catalogue
433k
433m
Kitchen + Bedroom
433n
Fig. 4D

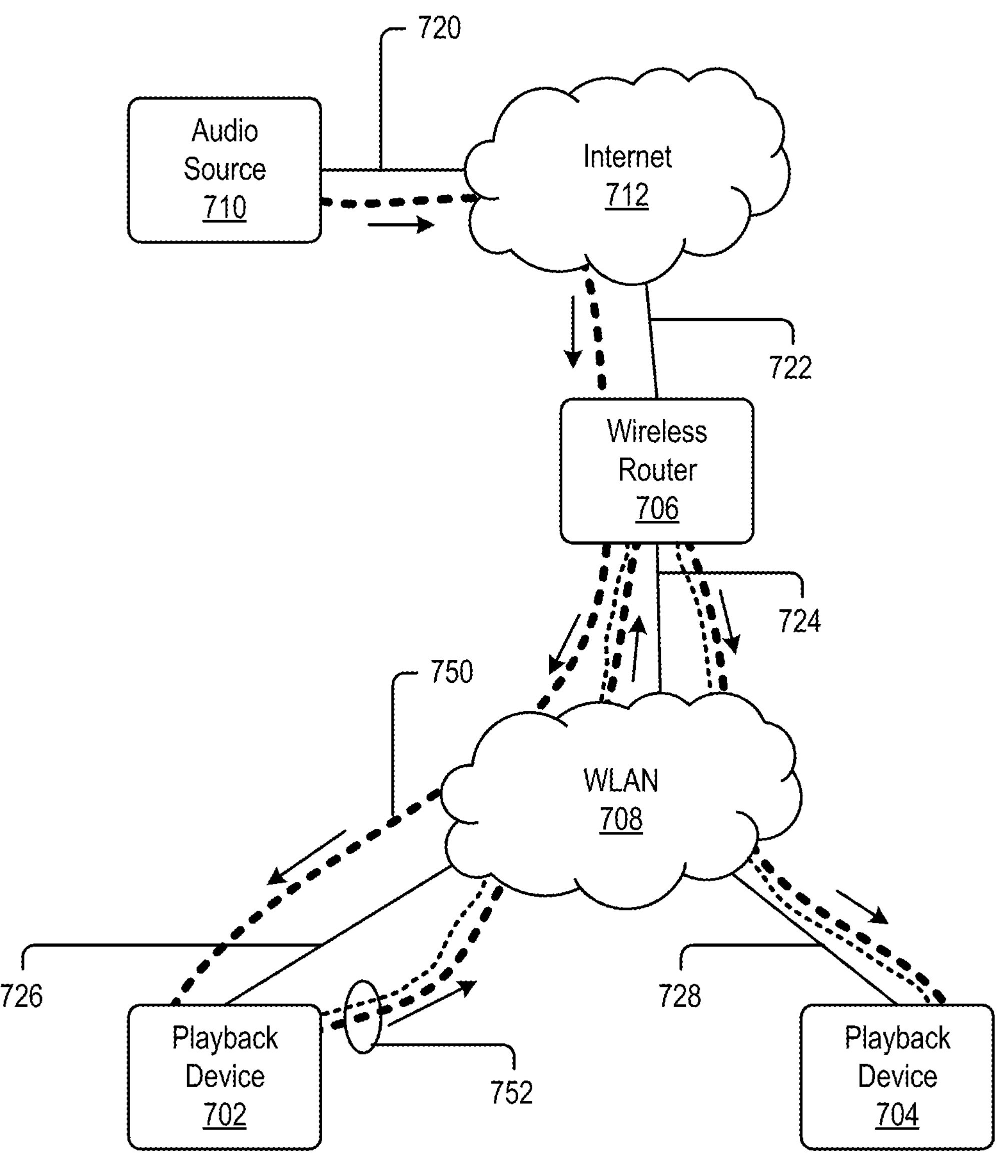
FIGURE 7A

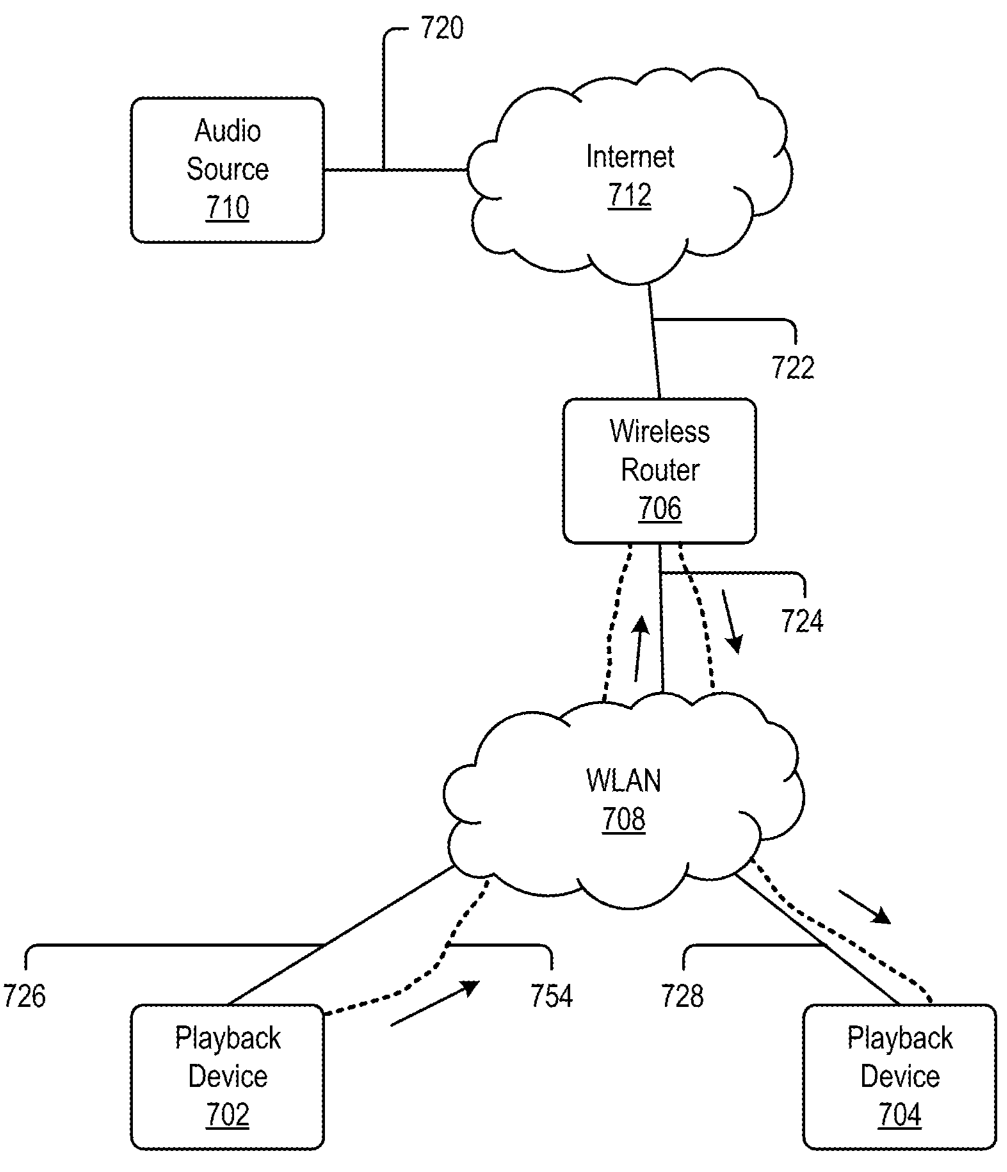
FIGURE 7B

AUDIO CACHING FOR SYNCHRONOUS PLAYBACK

CROSS-REFERENCE TO RELATED APPLICATIONS

This application claims priority to U.S. Provisional App. 63/325,937, titled "Audio Caching for Synchronous Playback," filed on Mar. 31, 2022, of the filing date of the present application. The entire contents of App. 63/325,937 are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1B shows a schematic diagram of the media playback system of FIG. 1A and one or more networks.

FIG. 1C shows a block diagram of a playback device.

FIG. 1D shows a block diagram of a playback device.

FIG. 1E shows a block diagram of a network microphone device.

FIGS. 1-I through 1L show schematic diagrams of corresponding media playback system zones.

FIGS. 4A-4D show schematic diagrams of a control device in various stages of operation in accordance with aspects of the disclosed technology.

FIG. 7A shows an example configuration of a media playback system comprising several playback devices configured for audio caching for groupwise playback according to some embodiments.

FIG. 7B shows an example configuration of a media playback system comprising several playback devices configured for audio caching for groupwise playback according to some embodiments.

Figure 1A:
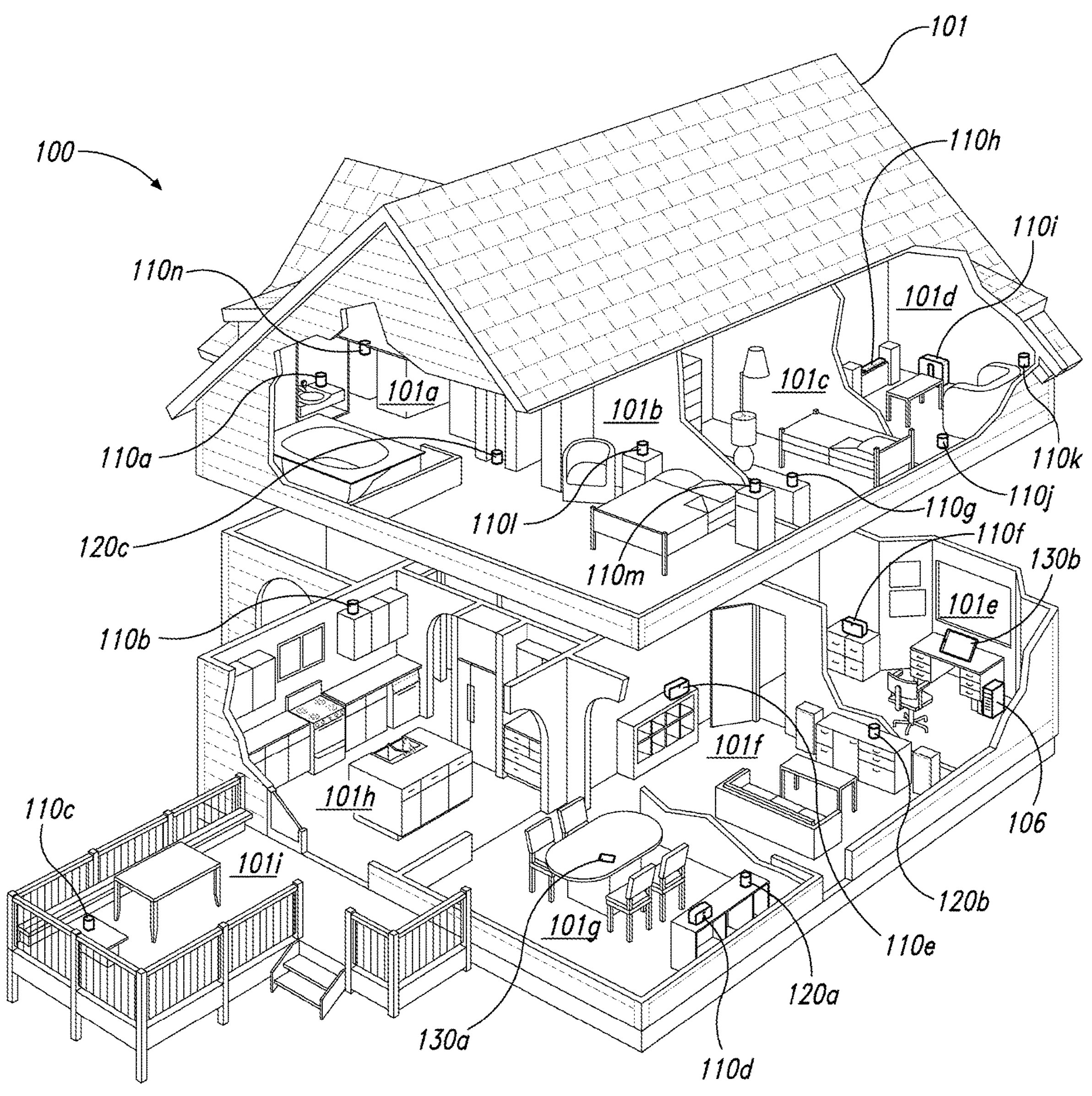
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Distributing high-resolution audio content to a network of wireless playback devices for groupwise playback requires more wireless network bandwidth and more network routing resources as compared to distributing standard-resolution audio content to a network of wireless playback devices for groupwise playback.

A single standard-resolution audio stream may require anywhere from about 96 kilobits per second (kbps) to 320 kpbs of transmission bandwidth depending on encoding type. By contrast, a single high-resolution audio stream can require up to 9,216 kpbs of transmission bandwidth—between 30 to 96 times the transmission bandwidth of a standard-resolution audio stream.

Distributing audio streams (standard-resolution and high-resolution) to several wireless playback devices via typical wireless network architectures generally requires the audio stream to traverse a wireless router several times. For example, the wireless router first routes the audio stream from the Internet (e.g., via a streaming audio content service) to a group coordinator or similar head-end device for processing. The group coordinator processes the audio stream, generates playback timing for the audio stream, and then distributes the audio stream and the playback timing to the other playback devices in the playback group via the wireless network so that the group of other playback devices (on their own or with the group coordinator) can use the playback timing to play the audio content in a groupwise fashion with each other. Distributing the audio stream and playback timing typically includes the group coordinator transmitting the audio stream and playback timing to the group members, which typically includes transmitting the audio content and playback timing to the wireless router which in turn forwards the audio content and playback timing to the other playback devices in the playback group.

In operation, network congestion can cause packets of audio content to arrive at some wireless playback devices late (i.e., after the time the audio content in the packets were scheduled to be played), which causes audio playback "drop out" by the wireless playback devices that failed to receive their packets of audio content in time for groupwise playback. Because the transmission bandwidth requirements for high-resolution audio are so much greater (i.e., between about 30 to about 100 times greater) than standard-resolution audio, playback devices can be (and typically are) more susceptible to "drop out" when playing high-resolution audio content than when playing standard-resolution audio content.

To overcome or at least ameliorate some aspects of the above-described technical problems associated with distributing high-resolution audio content to playback devices via wireless networks, embodiments disclosed herein include storing a cache of audio tracks at individual playback devices within a playback group. For example, in some embodiments, each playback device in a playback group is configured to maintain a local cache of audio tracks. When a particular audio track is to be played (e.g., when the group coordinator for the playback group receives a request to play the particular track), the group coordinator for the playback group determines whether the particular audio track is stored in its local cache of audio tracks.

If the particular audio track is not already stored in its local cache, the group coordinator obtains the particular audio track from an audio source, and then processes the particular audio track obtained from the audio source in the ordinary course. In particular, the group coordinator receives a stream of packets comprising the particular audio track, extracts the audio content for the particular audio track from the incoming stream, packages portions of the audio content for the particular audio track into a series of frames, generates playback timing for each frame containing a portion of the audio content, and then transmits the series of frames comprising the audio content and the playback timing for the audio content to the group members of the playback group (i.e., the other playback devices in the playback group). The group members (individually or in combination with the group coordinator) then use the playback timing to play the audio content in a groupwise fashion.

But if the particular audio track is already stored in its local cache, the group coordinator does not need to obtain the particular audio track from the audio source again. In some embodiments described herein, a framed version of the particular audio track is typically already stored in the group coordinator's local cache because the group coordinator has previously obtained the particular audio track from the audio source, extracted the audio content for the particular audio track, packaged portions of the audio content for the particular audio track into the series of frames, generated playback timing for each frame containing a portion of the audio content, and transmitted the series of frames comprising the audio content and the playback timing for the audio content to the group members of the playback group (i.e., the other playback devices in the playback group). But rather than removing the framed version of the particular audio track from its local cache after playback in the usual course, a group coordinator according to embodiments disclosed herein stores at least the framed version of the particular audio track in its local cache.

When the group coordinator's local cache already contains the framed version of the particular audio track, the group coordinator checks to confirm that the other playback devices in the playback group also have the framed version of the particular audio track stored in their local caches, too. In operation, the framed version of the particular audio track is typically already stored in each group member's cache for two reasons. First, the group member may have previously received the framed version of the particular audio track from the group coordinator when the group member joined the playback group with the group coordinator as part of the local cache maintenance procedures described herein. Second, the group member may have previously received the framed version of the particular audio track along with playback timing from the group coordinator during an earlier playback session. But rather than removing the framed version of the particular audio track from its local cache after playback in the usual course, a group member according to embodiments disclosed herein stores at least the framed version of the particular audio track in its local cache.

And if the group coordinator and the group member(s) each have the framed version of the particular audio track stored in their local caches, then the group coordinator generates playback timing for the particular audio track, and then transmits the generated playback timing (but not the framed version of the particular audio track) to the group members of the playback group. The group members (individually or in combination with the group coordinator) then use the playback timing to play the audio content of the particular audio track in a groupwise fashion.

By transmitting the playback timing for the particular audio track (but not the framed version of the particular audio track), the embodiments disclosed herein consume less network bandwidth and network routing resources as compared to typical arrangements where a group coordinator (or similar headend component) transmits audio content and corresponding playback timing to each group member (or similar device) for every playback instance.

Accordingly, some embodiments include a playback device (regardless of whether the playback device is configured as a group coordinator or a group member), among other features, (i) maintaining a cache comprising a plurality of audio tracks, wherein an individual audio track comprises a series of frames, and wherein an individual frame comprises a portion of the individual audio track, (ii) after receiving a request to play a particular audio track, determining whether the particular audio track is in the cache at the playback device; (iii) when the particular audio track is in the cache at the playback device, (a) identifying playback timing for each frame of the series of frames stored in the cache at the playback device based at least in part on a current clock time of a clock at the playback device, and (b) playing individual frames in the series of frames comprising the portions of the particular audio track according to the playback timing for the individual frames; and (iv) when the particular audio track is not in the cache at the playback device, obtaining the particular audio track from an audio information source.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office

101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

FIG. 1B is a schematic diagram of the media playback system 100 and a cloud network 102. For ease of illustration, certain devices of the media playback system 100 and the cloud network 102 are omitted from FIG. 1B. One or more communications links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communications links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110_l_ and 110_m_ comprise left audio and right audio channels, respectively, of multi-channel audio content, thereby producing or enhancing a stereo effect of the audio content. In some embodiments, the group 107_a_ includes additional playback devices 110. In other embodiments, however, the media playback system 100 omits the group 107_a_ and/or other grouped arrangements of the playback devices 110. Additional details regarding groups and other arrangements of playback devices are described in further detail below with respect to FIGS. 1-I through IM.

The media playback system 100 includes the NMDs 120_a_ and 120_d_, each comprising one or more microphones configured to receive voice utterances from a user. In the illustrated embodiment of FIG. 1B, the NMD 120_a_ is a standalone device and the NMD 120_d_ is integrated into the playback device 110_n_. The NMD 120_a_, for example, is configured to receive voice input 121 from a user 123. In some embodiments, the NMD 120_a_ transmits data associated with the received voice input 121 to a voice assistant service (VAS) configured to (i) process the received voice input data and (ii) transmit a corresponding command to the media playback system 100. In some aspects, for example, the computing device 106_c_ comprises one or more modules and/or servers of a VAS (e.g., a VAS operated by one or more of SONOS®, AMAZON®, GOOGLE® APPLE®, MICROSOFT®). The computing device 106_c_ can receive the voice input data from the NMD 120_a_ via the network 104 and the links 103. In response to receiving the voice input data, the computing device 106_c_ processes the voice input data (i.e., "Play Hey Jude by The Beatles"), and determines that the processed voice input includes a command to play a song (e.g., "Hey Jude"). The computing device 106_c_ accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110_a_ comprising an input/output 111. The input/output 111 can include an analog I/O 111_a_ (e.g., one or more wires, cables, and/or other suitable communications links configured to carry analog signals) and/or a digital I/O 111_b_ (e.g., one or more wires, cables, or other suitable communications links configured to carry digital signals). In some embodiments, the analog I/O 111_a_ is an audio line-in input connection comprising, for example, an auto-detecting 3.5 mm audio line-in connection. In some embodiments, the digital I/O 111_b_ comprises a Sony/Philips Digital Interface Format (S/PDIF) communication interface and/or cable and/or a Toshiba Link (TOSLINK) cable. In some embodiments, the digital I/O 111_b_ comprises an High-Definition Multimedia Interface (HDMI) interface and/or cable. In some embodiments, the digital I/O 111_b_ includes one or more wireless communications links comprising, for example, a radio frequency (RF), infrared, WiFi, Bluetooth, or another suitable communication protocol. In certain embodiments, the analog I/O 111_a_ and the digital I/O 111_b_ comprise interfaces (e.g., ports, plugs, jacks) configured to receive connectors of cables transmitting analog and digital signals, respectively, without necessarily including cables.

The playback device 110_a_, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communications link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110_a_ does not include an input/output 111 and receives all audio content via the network 104.

The playback device 110_a_ further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106_a-c_ via the network 104 (FIG. 1B)), amplify the received audio, and output the amplified audio for playback via one or more of the transducers 114. In some embodiments, the playback device 110_a_ optionally includes one or more microphones 115 (e.g., a single microphone, a plurality of microphones, a microphone array) (hereinafter referred to as "the microphones 115"). In certain embodiments, for example, the playback device 110_a_ having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112_a_ (referred to hereinafter as "the processors 112_a_"), memory 112_b_, software components 112_c_, a network interface 112_d_, one or more audio processing components 112_g_ (referred to hereinafter as "the audio components 112_g_"), one or more audio amplifiers 112_h_ (referred to hereinafter as "the amplifiers 112_h_"), and power 112_i_ (e.g., one or more power supplies, power cables, power receptacles, batteries, induction coils, Power-over Ethernet (POE) interfaces, and/or other suitable sources of electric power). In some embodiments, the electronics 112 optionally include one or more other components 112_j_ (e.g., one or more sensors, video displays, touchscreens, battery charging bases).

The processors 112_a_ can comprise clock-driven computing component(s) configured to process data, and the memory 112_b_ can comprise a computer-readable medium (e.g., a tangible, non-transitory computer-readable medium, data storage loaded with one or more of the software components 112_c_) configured to store instructions for performing various operations and/or functions. The processors 112_a_ are configured to execute the instructions stored on the memory 112_b_ to perform one or more of the operations. The operations can include, for example, causing the playback device 110_a_ to retrieve audio content from an audio source (e.g., one or more of the computing devices 106_a-c_ (FIG. 1B)), and/or another one of the playback devices 110. In some embodiments, the operations further include causing the playback device 110_a_ to send audio content to another one of the playback devices 110_a_ and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio processing components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

Figures 1F, 1G, 1H:
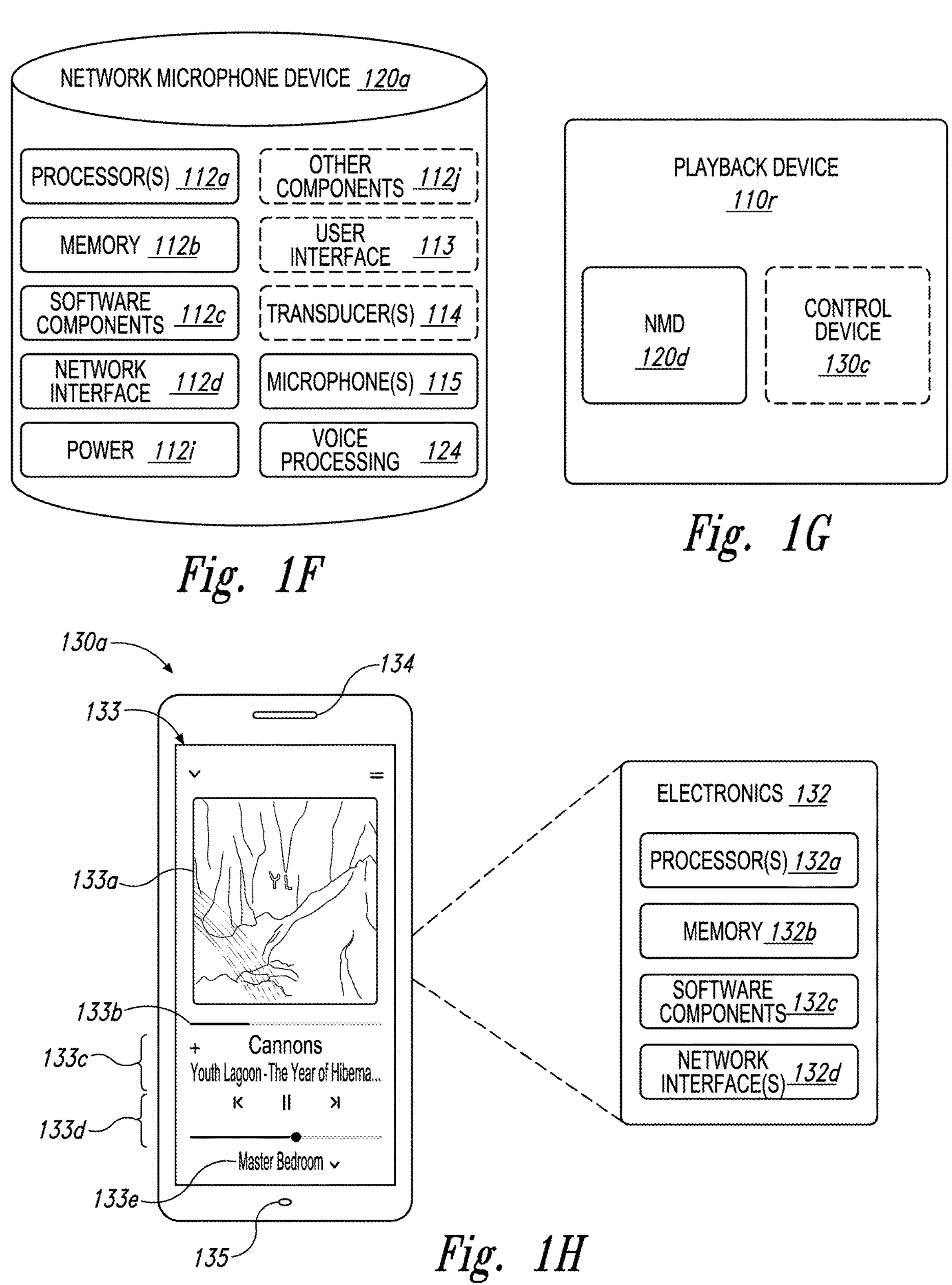
FIG. 1F shows a block diagram of a network microphone device.
FIG. 1G shows a block diagram of a playback device.
FIG. 1H shows a partially schematic diagram of a control device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of playback devices. The network interface 132*d* can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

Additional control device embodiments are described in further detail below with respect to FIGS. 4A-4D and 5.

e. Suitable Playback Device Configurations

Figure 1M:
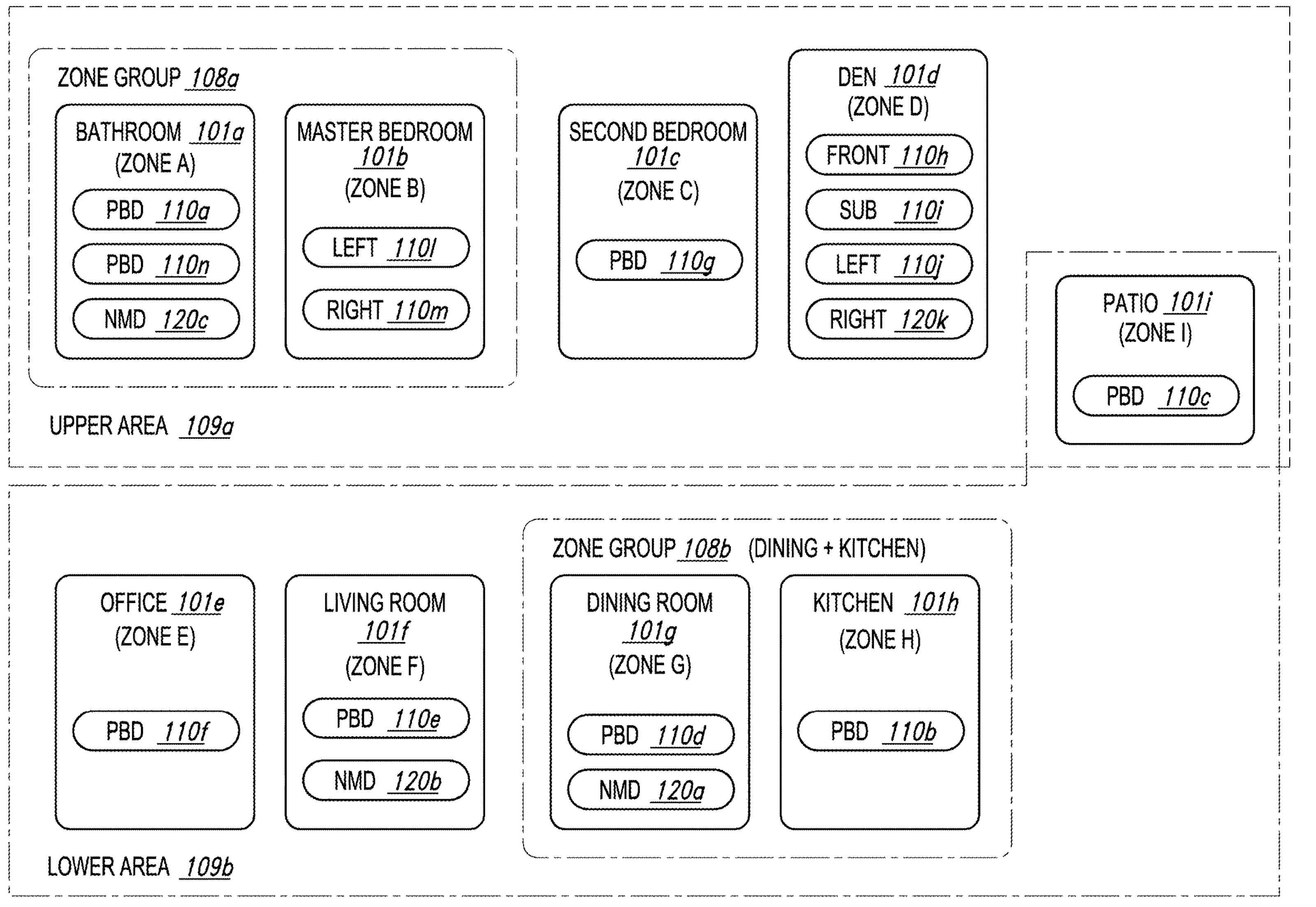
FIG. 1M shows a schematic diagram of media playback system areas.

FIGS. 1-1 through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
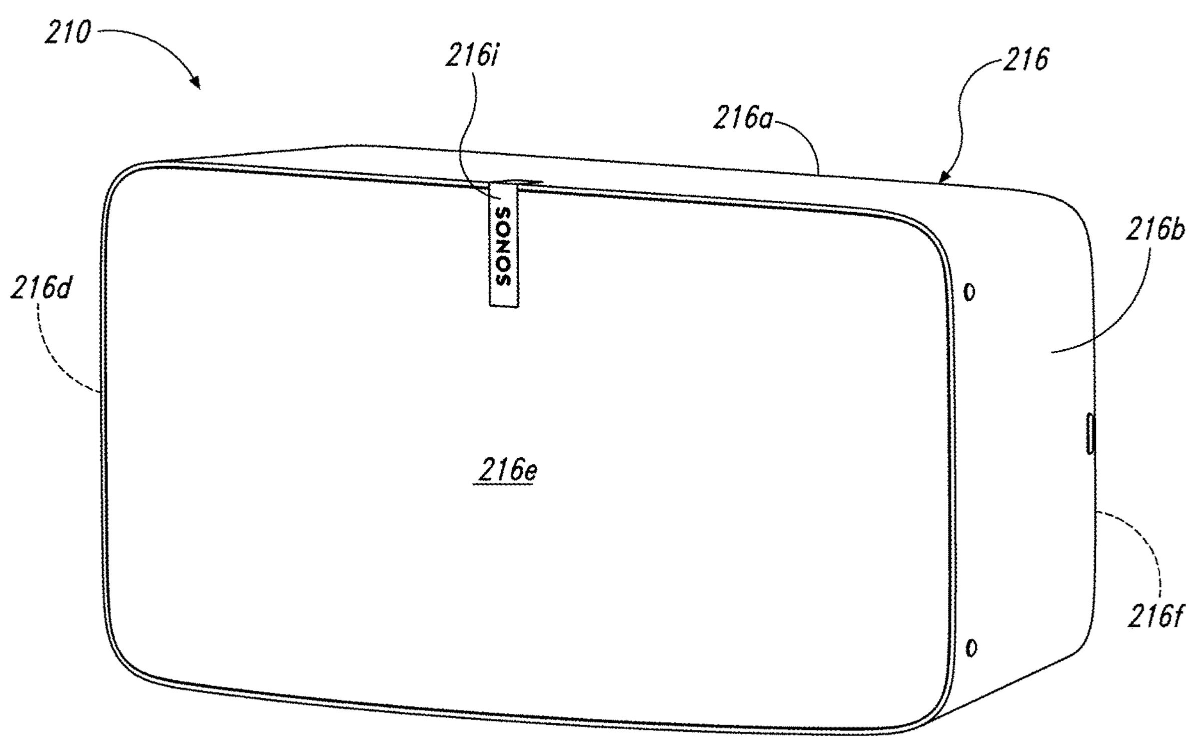
FIG. 2A shows a front isometric view of a playback device configured in accordance with aspects of the disclosed technology.
Figure 2B:
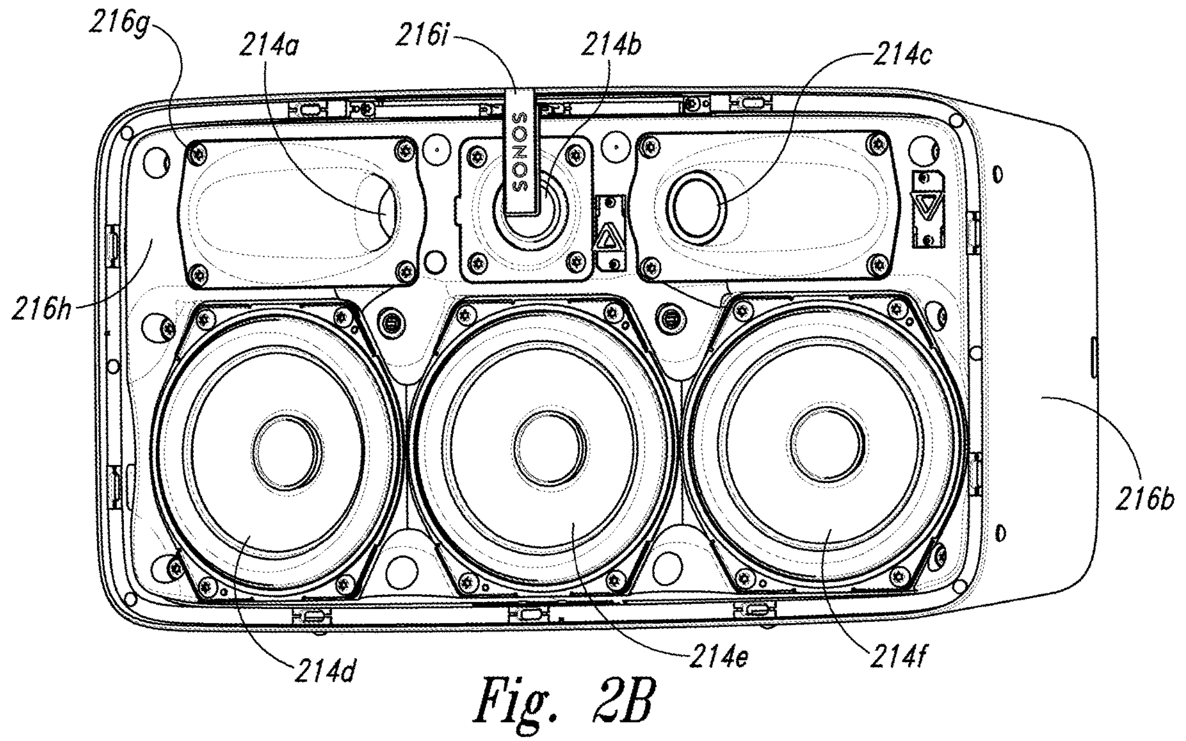
FIG. 2B shows a front isometric view of the playback device of FIG. 3A without a grille.
Figure 2C:
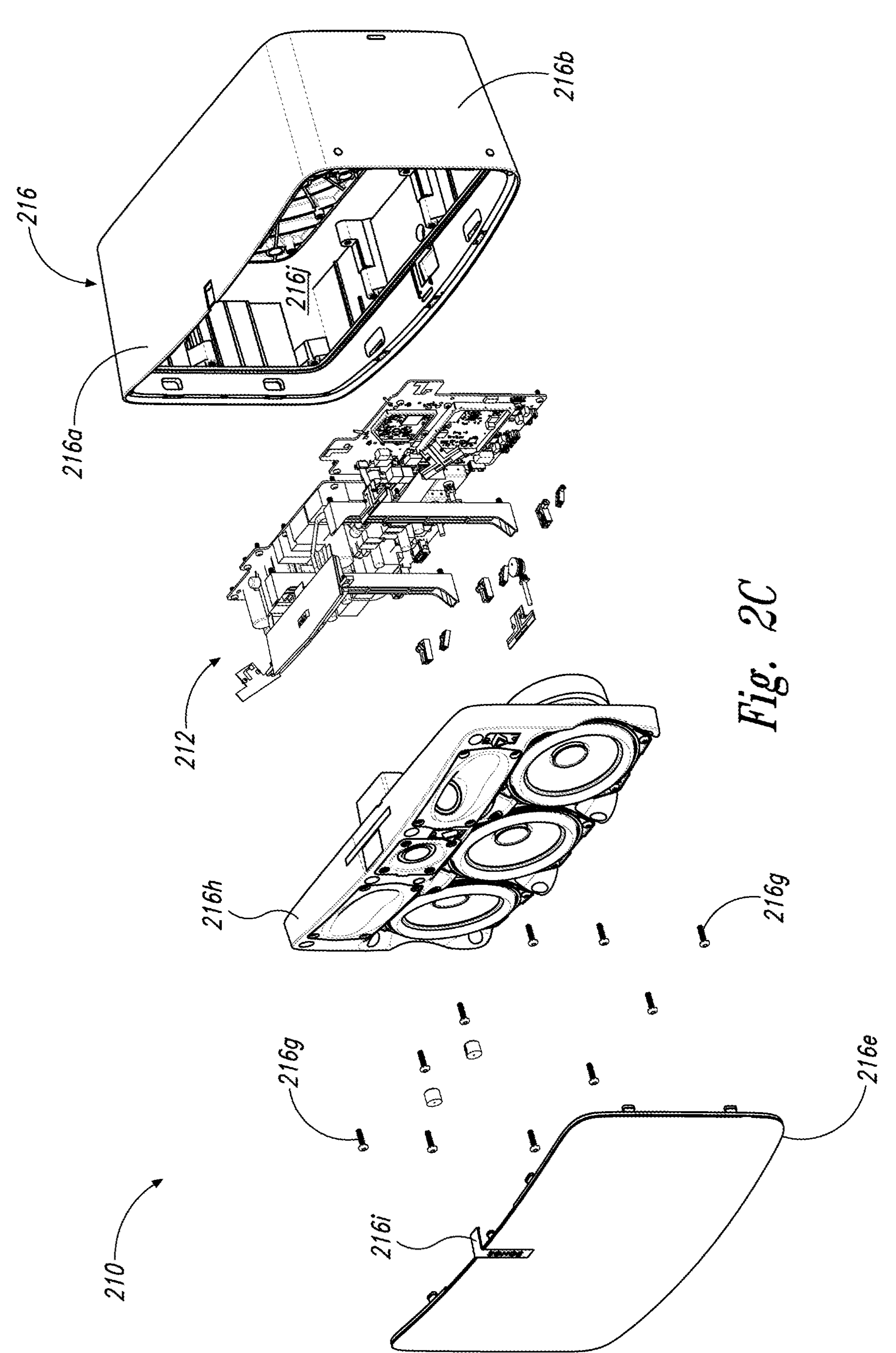
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some embodiments, however, the playback device 210 omits the filter 216*i*. In other embodiments, the playback device 210 includes one or more additional filters aligned with the transducers 214*b* and/or at least another of the transducers 214.

Figures 3A, 3B, 3D:
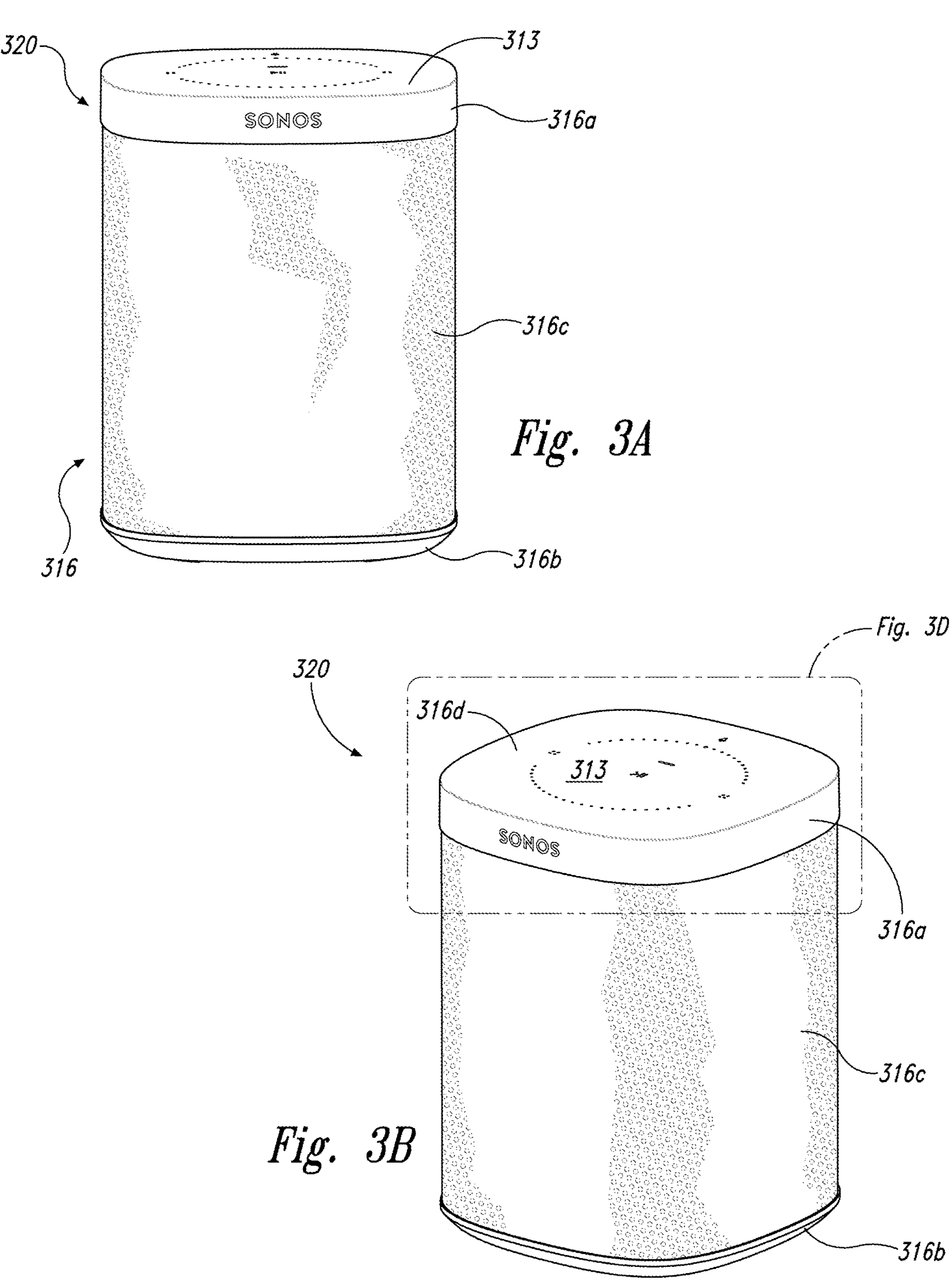
FIG. 3A shows a front view of a network microphone device configured in accordance with aspects of the disclosed technology.
FIG. 3B shows a side isometric view of the network microphone device of FIG. 3A.
FIG. 3D shows an enlarged view of a portion of FIG. 3B.
Figure 3C:
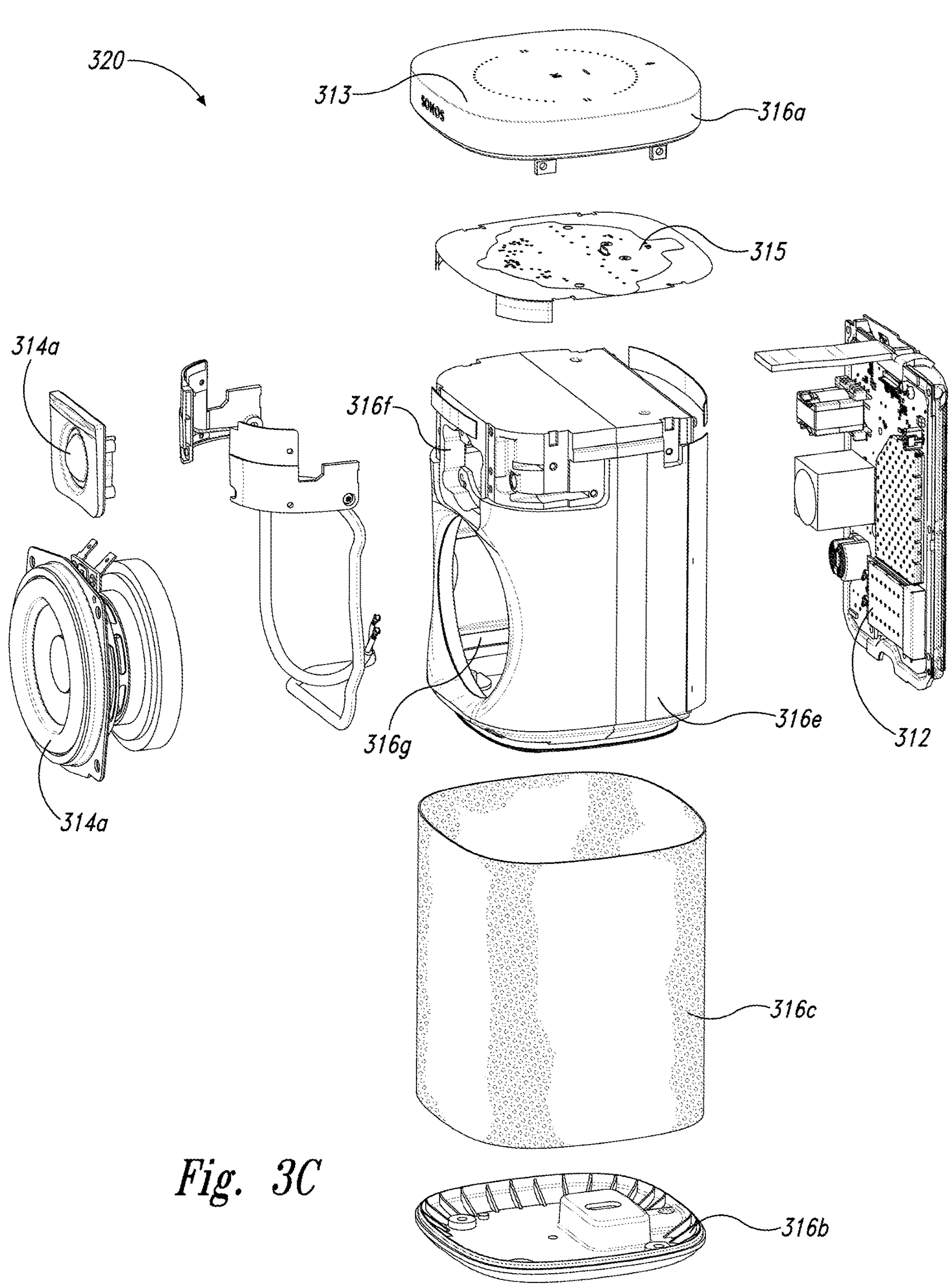
FIG. 3C shows an exploded view of the network microphone device of FIGS. 3A and 3B.
Figure 3D:
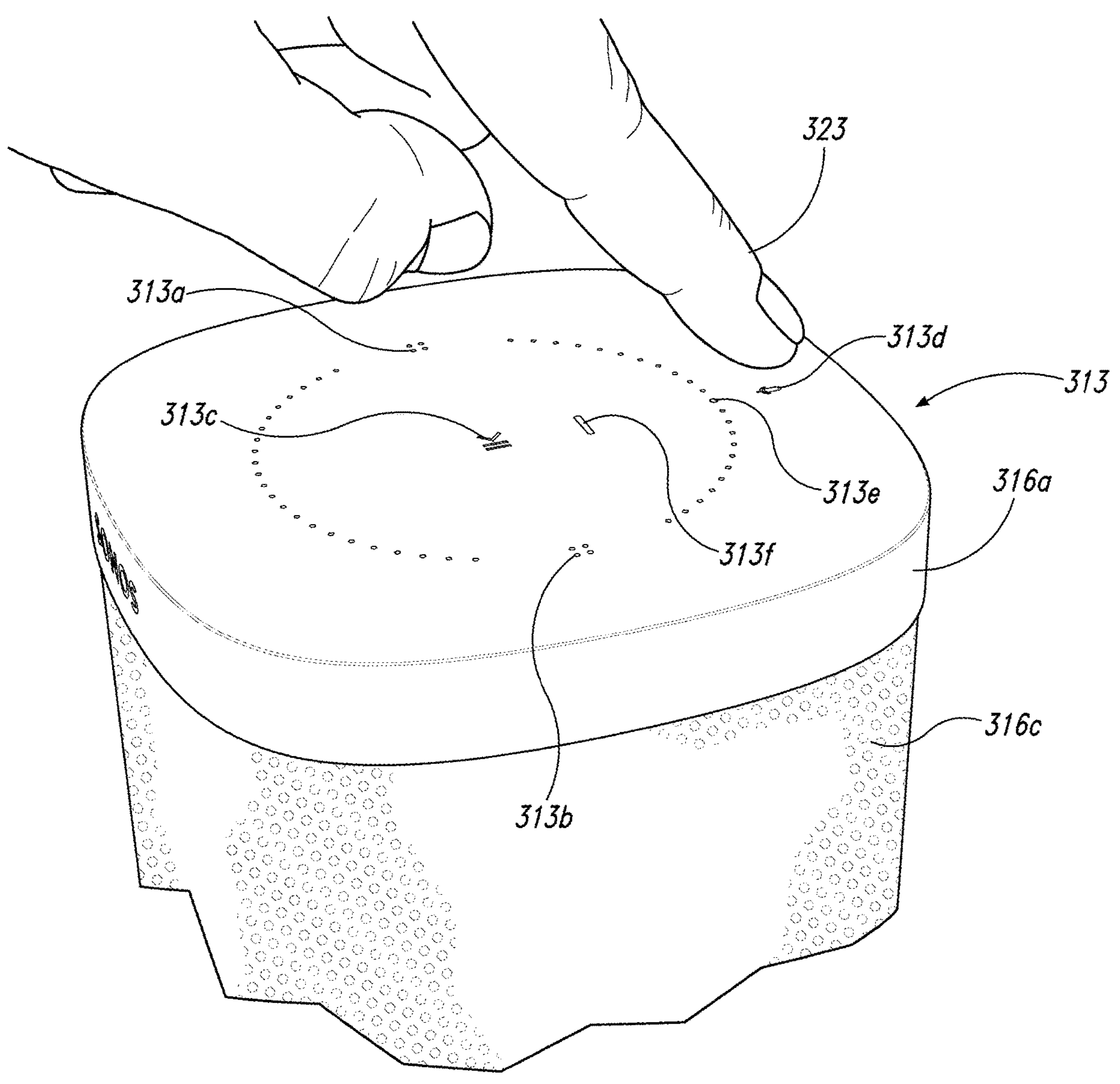

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316*a*, a lower portion 316*b* and an intermediate portion 316*c* (e.g., a grille). A plurality of ports, holes or apertures 316*d* in the upper portion 316*a* allow sound to pass through to one or more microphones 315 (FIG. 3C) positioned within the housing 316. The one or more microphones 316 are configured to received sound via the apertures 316*d* and produce electrical signals based on the received sound. In the illustrated embodiment, a frame 316*e* (FIG. 3C) of the housing 316 surrounds cavities 316*f* and 316*g* configured to house, respectively, a first transducer 314*a* (e.g., a tweeter) and a second transducer 314*b* (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio content corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figures 3E, 3F:
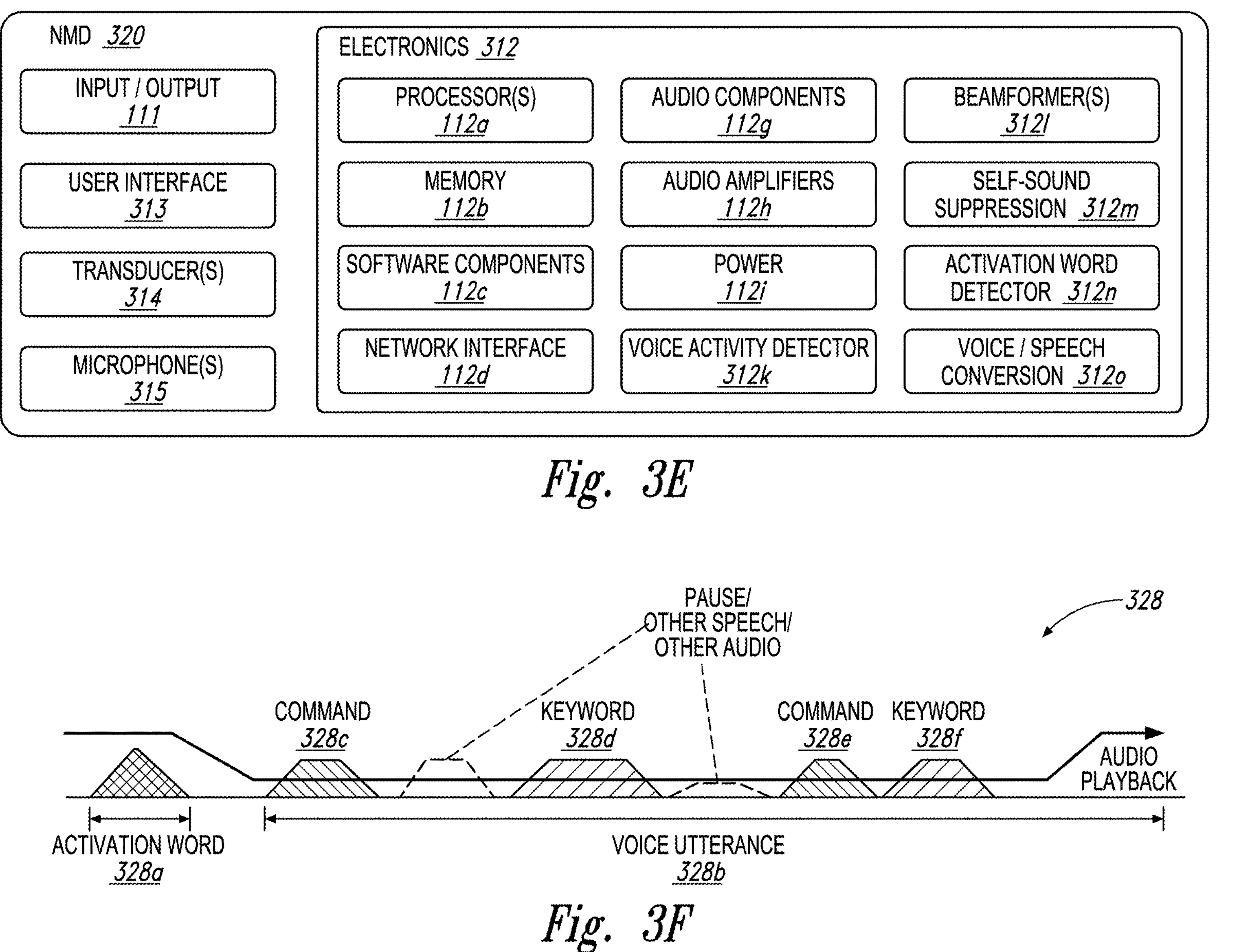
FIG. 3E shows a block diagram of the network microphone device of FIGS. 3A-3D
FIG. 3F shows a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some embodiments, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include a activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 557*a*. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selections a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
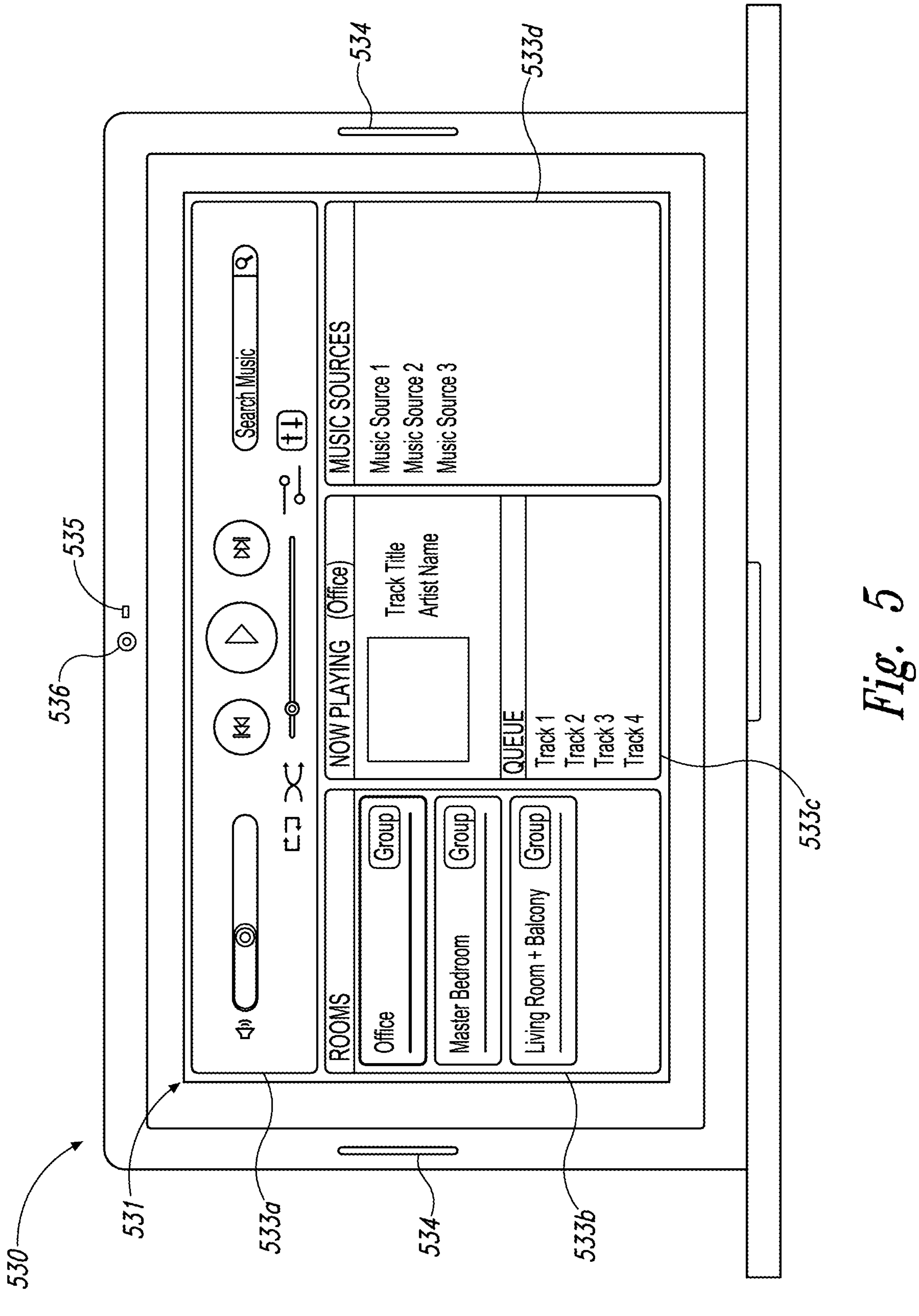
FIG. 5 shows a front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
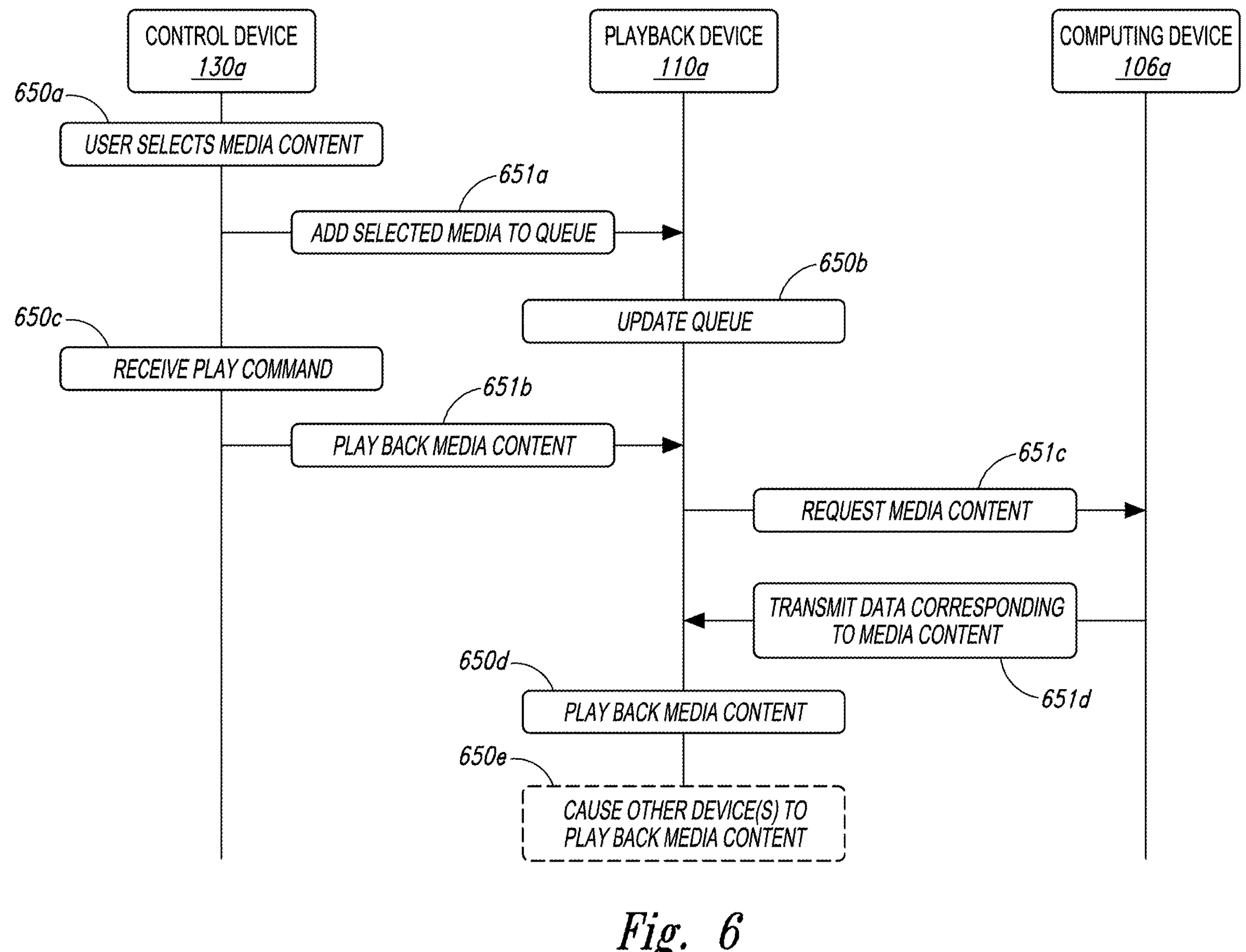
FIG. 6 shows a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the first computing device 106*a* requesting the selected media content. The first computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the first computing device 106*a*, and begin playback of the selected media content in response to a message from the playback device 110*a* such that all of the devices in the group play back the selected media content in synchrony.

IV. Overview of Example Embodiments

As mentioned above, playback devices according to some embodiments are configured to, among other features, conserve network bandwidth and network routing resources by storing a plurality of audio tracks in a local cache at each playback device so that, when a particular audio track already stored in the caches at the playback devices is to be played in a groupwise fashion by the playback devices, the group coordinator of the group of playback devices can send the playback timing for that particular audio track (but not the actual audio track itself) to the playback devices in the group. And in turn, the playback devices in the group can use the playback timing received from the group coordinator to play the particular audio track stored in their caches in a groupwise fashion (e.g., in synchrony) with the other playback devices in the playback group.

In this manner, for an audio track that is already stored in local caches at individual group members in a playback group, rather than the group coordinator streaming the audio content of the audio track and the playback timing for the audio content of the audio track to the group members in the playback group at the time of playback, the group coordinator instead sends the playback timing for the audio content (but not the actual audio content itself) to the group members, and each group member uses the playback timing received from the group coordinator to play its own locally-cached copy of the audio content for the audio track in a groupwise fashion with the other playback devices in the playback group.

V. Technical Features

In some embodiments, at least some aspects of the technical solutions derive from the technical structure and organization of the audio content, the playback timing, and clock timing used by the playback devices to play audio content together in a groupwise fashion.

Therefore, to aid in understanding certain aspects of the disclosed technical solutions, certain technical details of the audio content, playback timing, and clock timing are described herein. Except where noted, the technical details of the audio content, playback timing, and clock timing described herein are the same or substantially the same for the examples shown and described herein with reference to FIGS. 7A, 7B, and 8.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a streaming video service, or any other source of audio-visual media content now known or later developed; (iv) text-to-speech or other audible content from a voice assistant service (VAS), such as Amazon Alexa or other VAS services now known or later developed; and/or (v) audio content from a telephone, video phone, video/teleconferencing system or other application configured to allow users to communicate with each other via audio and/or video.

In some embodiments, a group coordinator (sometimes referred to as a "sourcing" device) obtains any of the aforementioned types of audio content from an audio source via an interface on the group coordinator, e.g., one of the group coordinator's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a group coordinator.

As mentioned earlier, a playback device that receives or otherwise obtains audio information from an audio source for playback and/or distribution to other playback devices in a playback group is sometimes referred to herein as the group coordinator or "sourcing" device for the playback group. One function of the group coordinator of a playback group is to process received audio information for playback and/or distribution to group members of the playback group for groupwise playback.

In some embodiments, the group coordinator transmits the processed audio information to all the other group members in the playback group. In some embodiments, the group coordinator transmits the audio information to a multicast network address, and all the group members configured to play the audio content (i.e., the group members of the playback group) receive the audio information via that multicast address.

In some embodiments, the group coordinator receives audio information from an audio source in digital form, e.g., via a stream of packets. In some embodiments, individual packets in the stream have a sequence number or other identifier that specifies an ordering of the packets. In operation, the group coordinator uses the sequence number or other identifier to detect missing packets and/or to reassemble the packets of the stream in the correct order before performing further processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out.

For example, in some embodiments, individual packets from an audio source may include both a timestamp and a sequence number. The timestamp is used to place the incoming packets of audio information in the correct order, and the sequence number is mainly used to detect packet losses. In operation, the sequence numbers increase by one for each Real-time Transport Protocol (RTP) packet transmitted from the audio source, and timestamps increase by the time "covered" by an RTP packet. In instances where a portion of audio content is split across multiple RTP packets, multiple RTP packets can have the same timestamp.

In some embodiments, the group coordinator does not change the sequence number or identifier of a received packet during processing. In some embodiments, the group coordinator reorders at least a first set of packets in a first packet stream received from an audio source (an inbound stream) based on each packet's sequence identifier, extracts audio information from the received packets, reassembles a bitstream of audio information from the received packets, and then repacketizes the reassembled bitstream into a second set of packets and/or frames (an outbound stream), where packets and/or frames in the second set of packets and/or frames have sequence numbers and/or timestamps that differ from the sequence numbers and/or timestamps of the packets and/or frames in the first set of packets (or first stream).

In some embodiments, individual packets (or frames) in the second stream are a different length (i.e., shorter or longer) than individual packets in the first stream. In some embodiments, reassembling a bitstream from the incoming packet stream and then subsequently repacketizing the reassembled bitstream into a different set of packets (or frames) facilitates uniform processing and/or transmission of audio content by the group coordinator and uniform processing by the group members that receive the audio information from the group coordinator. However, for some delay-sensitive audio information, reassembly and repacketization (or reframing) may be undesirable, and therefore, in some embodiments, the group coordinator may not perform reassembly and repacketization (or reframing) for some (or all) audio information that it receives before playing the audio information and/or transmitting the audio information to other playback devices/group members.

b. Playback Timing

In some embodiments, the playback devices disclosed and described herein use playback timing to play audio content in a groupwise fashion (e.g., in synchrony) with each other. An individual playback device can generate playback timing and/or playback audio content according to playback timing, based on the playback device's configuration in the playback group. The sourcing playback device (acting as a group coordinator) that generates the playback timing for audio content also transmits that generated playback timing to all the playback devices that are configured to play the audio content (the group members).

In some embodiments, the group coordinator transmits playback timing separately from the audio information. In some embodiments, the group coordinator transmits the playback timing to all the group members by transmitting the playback timing to a multicast network address for the playback group, and all the group members receive the playback timing via the playback group's multicast address. In some embodiments, the group coordinator transmits the playback timing to each group member by transmitting the playback timing to each group member's unicast network address.

In some embodiments, the playback timing is generated for individual frames (or packets) of audio content. As described above, in some embodiments, the audio content is packaged into a series of frames (or packets) where an individual frame (or packet) comprises a portion of the audio content. In some embodiments, the playback timing for the audio content includes a playback time for each frame (or packet) of audio content. In some embodiments, the playback timing for an individual frame (or packet) is included within the frame (or packet), e.g., in the header of the frame (or packet), in an extended header of the frame (or packet), and/or in the payload portion of the frame (or packet).

In some embodiments, the playback time for an individual frame (or packet) is identified within a timestamp or other indication. In such embodiments, the timestamp (or other indication) represents a time to play the one or more portions of audio content within that individual frame (or packet).

In operation, when the playback timing for an individual frame (or packet) is generated, the playback timing for that individual frame (or packet) is or at least indicates a future time relative to a current clock time of a reference clock at the time that the playback timing for that individual frame (or packet) is generated.

In operation, a playback device tasked with playing particular audio content will play the portion(s) of the particular audio content within an individual frame (or packet) at the playback time specified by the playback timing for that individual frame (or packet), as adjusted to accommodate for differences between the clock timing and a clock at the playback device that is tasked with playing the audio content, as described in more detail below.

c. Clock Timing

The playback devices disclosed and described herein use clock timing to generate playback timing for audio content and/or to play the audio content based on the generated playback timing.

In some embodiments, the group coordinator uses clock timing from a reference clock (e.g., a device clock, a digital-to-audio converter clock, a playback time reference clock, or any other clock) to generate playback timing for audio content that the group coordinator receives from an audio source. The reference clock can be a "local" clock at the group coordinator or a "remote" clock at a separate network device, e.g., another playback device, a computing device, or another network device configured to provide clock timing for use by (i) a group coordinator to generate playback timing and/or (ii) the group coordinator and group members to play back audio content.

In some embodiments, all of the playback devices tasked with playing particular audio content in synchrony (i.e., all the group members in a playback group) use the same clock timing from the same reference clock to play back that particular audio content in synchrony with each other. In some embodiments, playback devices use the same clock timing to play audio content that was used to generate the playback timing for the audio content. The reference clock may be a local clock of the group coordinator, but the reference clock could also be a clock at a different device, such as a group member or a computing device (e.g., a smartphone, tablet computer, smartwatch, or other computing device).

In operation, the device that generates the clock timing also transmits the clock timing to all the playback devices that need to use the clock timing for generating playback timing and/or playing back audio content. In some embodiments, the device that generates the clock timing (e.g., the group coordinator in some embodiments) transmits the clock timing to a multicast network address, and all the playback devices configured to generate playback timing and/or play audio content (e.g., the group coordinator and/or the group members) receive the clock timing via that multicast address. In some embodiments, the device that generates the clock timing alternatively transmits the clock timing to each unicast network address of each playback device in the playback group.

In some embodiments, the device that generates the clock timing is the playback device configured to operate as the group coordinator for the playback group. And in operation, the group coordinator of the playback group transmits the clock timing to all the group members of the playback group. The group coordinator and the group members all use the clock timing and the playback timing to play audio content in a groupwise manner. In some embodiments, the group coordinator and the group members all use the clock timing and the playback timing to play audio content in synchrony with each other.

d. Generating Playback Timing by the Group Coordinator

In some embodiments, the group coordinator: (i) generates playback timing for audio content based on clock timing from a local clock at the group coordinator, and (ii) transmits the generated playback timing to all the other group members in the playback group. In operation, when generating playback timing for an individual frame (or packet), the group coordinator adds a "timing advance" to the current clock time of a local clock at the group coordinator that the group coordinator is using for generating the playback timing.

In some embodiments, the "timing advance" is based on an amount of time that is greater than or equal to the sum of (i) the network transit time required for frames and/or packets comprising audio content transmitted from the group coordinator to arrive at all the other group members and (ii) the amount of time required for all the other group members to process received frames/packets from the group coordinator for playback.

In some embodiments, the group coordinator determines a timing advance by sending one or more test packets to one or more (or perhaps all) of the other group members, and then receiving test response packets back from those one or more group members. In some embodiments, the group coordinator and the one or more group members negotiate a timing advance via multiple test and response messages. In some embodiments with more than two group members, the group coordinator determines a timing advance by exchanging test and response messages with all of the group members, and then setting a timing advance that is sufficient for the group member having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant for the duration of a groupwise playback session. In other embodiments, the group coordinator can change the timing advance in response to a request from a group member indicating that a greater timing advance is required (e.g., because the group member is not receiving packets comprising portions of audio content until after one or more other group members have already played the portions of audio content) or a shorter timing advance would be sufficient (e.g., because the group member is buffering more packets comprising portions of audio content than necessary to provide consistent, reliable playback).

As described in more detail below, all the playback devices in a playback group configured to play the audio content in the groupwise fashion will use the playback timing and the clock timing to play the audio content in the groupwise fashion with each other, e.g., to play the audio content in synchrony with each other.

e. Generating Playback Timing with Clock Timing from a Remote Clock

In some embodiments, the group coordinator may generate playback timing for audio content based on clock timing from a "remote" clock at another network device, e.g., another playback device, another computing device (e.g., a smartphone, tablet computer, smartwatch, or other computing device configurable to provide clock timing sufficient for use by the group coordinator generate playback timing and/or playback audio content). Generating playback timing based on clock timing from a remote clock at another network device is more complicated than generating playback timing based on clock timing from a local clock in embodiments where the same clock timing is used for both (i) generating playback timing and (ii) playing audio content based on the playback timing.

In embodiments where the group coordinator generates playback timing for audio content based on clock timing from a remote cock, the playback timing for an individual frame (or packet) is based on (i) a "timing offset" between (a) a local clock at the group coordinator that the group coordinator uses for generating the playback timing and (b) the clock timing from the remote reference clock, and (ii) a "timing advance" based on an amount of time that is greater than or equal to the sum of (a) the network transit time required for packets (or frames) transmitted from the group coordinator to arrive at the group members and (b) the amount of time required for all of those group members to process frames and/or packets comprising audio information received from the group coordinator for playback.

For an individual frame (or packet) containing a portion(s) of the audio content, the group coordinator generates playback timing for that individual frame (or packet) by adding the sum of the "timing offset" and the "timing advance" to a current time of the local clock at the group coordinator that the group coordinator uses to generate the playback timing for the audio information. In operation, the "timing offset" may be a positive or a negative offset, depending on whether the local clock at the group coordinator is ahead of or behind the remote clock providing the clock timing. The "timing advance" is a positive number because it represents a future time relative to the local clock time, as adjusted by the "timing offset."

By adding the sum of the "timing advance" and the "timing offset" to a current time of the local clock at the group coordinator that the group coordinator is using to generate the playback timing for the audio content, the group coordinator is, in effect, generating the playback timing relative to the remote clock.

In some embodiments, and as described above, the "timing advance" is based on an amount of time that is greater than or equal to the sum of (i) the network transit time required for frames and/or packets comprising audio content transmitted from the group coordinator to arrive at all other group members and (ii) the amount of time required for all the other group members to process received frames/packets from the sourcing playback device for playback.

In some embodiments, the group coordinator determines a timing advance via signaling between the group coordinator and one or more group members, as described previously. Further, in some embodiments, the timing advance is less than about 50 milliseconds, less than about 20-30 milliseconds, or less than about 10 milliseconds, depending on the audio content playback latency requirements because different audio content may have different latency requirements. For example, audio content having associated video content may have lower latency requirements than audio content that does not have associated video content because audio content associating with video content must be synchronized with its corresponding video content whereas audio content that is not associated with video content need not be synchronized with any corresponding video content. In some embodiments, the timing advance remains constant after being determined, or at least constant for the duration of a playback session. And in some embodiments, the group coordinator can change the timing advance based on further signaling between the group coordinator (generating the playback timing) and one or more group members (that are using the playback timing to play audio content).

As described in more detail below, all the playback devices configured to play the audio content in the groupwise fashion will use the playback timing and the clock timing to play the audio content in the groupwise fashion with each other.

f. Playing Audio Content Using Local Playback Timing and Local Clock Timing

In some embodiments, the group coordinator is configured to play audio content in a groupwise fashion with one or more group members. And if the group coordinator is using clock timing from a local clock at the group coordinator to generate the playback timing, then the group coordinator will play the audio content using locally-generated playback timing and the locally-generated clock timing. In operation, the group coordinator plays an individual frame (or packet) comprising portions of the audio content when the local clock that the group coordinator used to generate the playback timing reaches the time specified in the playback timing for that individual frame (or packet).

For example, recall that when generating playback timing for an individual frame (or packet) of audio content, the group coordinator device adds a "timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio content in an individual frame (or packet) 30 milliseconds after creating the playback timing for that individual frame (or packet).

In this manner, the group coordinator plays audio content by using locally-generated playback timing and clock timing from a local reference clock at the group coordinator. As described further below, by playing the portion(s) of the audio content of an individual frame and/or packet when the clock time of the local reference clock reaches the playback timing for that individual frame or packet, the group coordinator plays that portion(s) of the audio content in that individual frame and/or packet in a groupwise fashion (e.g., in synchrony with) with other group members in the playback group.

g. Playing Audio Content Using Local Playback Timing and Remote Clock Timing

As mentioned earlier, in some embodiments, a group coordinator generates playback timing for audio content based on clock timing from a remote clock, i.e., a clock at another network device separate from the group coordinator, e.g., another playback device, or another computing device (e.g., a smartphone, laptop, media server, or other computing device configurable to provide clock timing sufficient for use by a playback device generate playback timing and/or playback audio content). Because the group coordinator used clock timing from the "remote" clock to generate the playback timing for the audio content, the group coordinator also uses the clock timing from the "remote" clock to play the audio content. In this manner, the group coordinator plays audio content using the locally-generated playback timing and the clock timing from the remote clock.

Recall that, in embodiments where the group coordinator generates playback timing for audio content based on clock timing from a remote clock, the group coordinator generates the playback timing for an individual frame (or packet) based on (i) a "timing offset" based on a difference between (a) a local clock at the group coordinator and (b) the clock timing from the remote clock, and (ii) a "timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio information received from the group coordinator for playback. And further recall that the group coordinator transmits the generated playback timing to all of the group members in the playback group tasked with playing the audio content in synchrony.

In this scenario, to play an individual frame (or packet) of audio content in synchrony with the one or more other group members, the group coordinator subtracts the "timing offset" from the playback timing for that individual frame (or packet) to generate a "local" playback time for playing the audio content based on the audio information within that individual frame (or packet). After generating the "local" playback time for playing the portion(s) of the audio content within the individual frame (or packet), the group coordinator plays the portion(s) of the audio content in the individual frame (or packet) when the local clock that the group coordinator is using to play the audio content reaches the "local" playback time for that individual frame (or packet). By subtracting the "timing offset" from the playback timing to generate the "local" playback time for an individual frame, the group coordinator effectively plays the portion(s) of audio content corresponding to the audio information in that frame/packet with reference to the clock timing from the remote clock.

h. Playing Audio Content Using Remote Playback Timing and Local Clock Timing

Recall that, in some embodiments, the group coordinator transmits the audio content and the playback timing for the audio content to one or more group members. If the group member that receives (i.e., the receiving group member) the audio content and playback timing from the group coordinator is the same group member that provided clock timing to the group coordinator that the group coordinator used for generating the playback timing, then the receiving group member in this instance plays the audio content using the playback timing received from the group coordinator (i.e., remote playback timing) and the group member's own clock timing (i.e., local clock timing). Because the group coordinator used clock timing from a clock at the receiving group member to generate the playback timing, the receiving group member also uses the clock timing from its local clock to play the audio content. In this manner, the receiving group member plays audio content using the remote playback timing (i.e., from the group coordinator) and the clock timing from its local clock (i.e., its local clock timing).

To play an individual frame (or packet) of the audio content in synchrony with the group coordinator (and every other playback device that receives the playback timing from the group coordinator and clock timing from the receiving group member), the receiving group member (i) receives the frames (or packets) comprising the portions of the audio content from the group coordinator, (ii) receives the playback timing for the audio content from the group coordinator (e.g., in the frame and/or packet headers of the frames and/or packets comprising the portions of the audio content or perhaps separately from the frames and/or packets comprising the portions of the audio content), and (iii) plays the portion(s) of the audio content in the individual frame (or packet) when the local clock that the receiving group member used to generate the clock timing reaches the playback time specified in the playback timing for that individual frame (or packet) received from the group coordinator.

Because the group coordinator uses the "timing offset" (which is the difference between the clock timing at the receiving group member and the clock timing at the group coordinator in this scenario) when generating the playback timing, and because this "timing offset" already accounts for differences between timing at the group coordinator and the receiving group member, the receiving group member in this scenario plays individual frames (or packets) comprising portions of the audio content when the receiving group member's local clock (that was used to generated the clock timing) reaches the playback time for an individual frame (or packet) specified in the playback timing for that individual frame (or packet).

And because the receiving group member plays frames (or packets) comprising portions of the audio content according to the playback timing, and because the group coordinator plays the same frames (or packets) comprising portions of the audio content according to the playback timing and the determined "timing offset," the receiving group member and the group coordinator play the same frames (or packets) comprising audio content corresponding to the same portions of audio content in synchrony, i.e., at the same time or at substantially the same time.

i. Playing Audio Content Using Remote Playback Timing and Remote Clock Timing

Recall that, in some embodiments, the sourcing playback device (e.g., which in many cases may be the group coordinator) transmits the audio content and the playback timing for the audio content to one or more other playback devices in the playback group. And further recall that, in some embodiments, the network device providing the clock timing can be a different device than the playback device providing the audio content and playback timing (i.e., the sourcing playback device, which in many cases may be the group coordinator). Playback devices that receive the audio content, the playback timing, and the clock timing from one or more other devices are configured to play the audio content using the playback timing from the device that provided the playback timing (i.e., remote playback timing) and clock timing from a clock at the device that provided the clock timing (i.e., remote clock timing). In this manner, the receiving group member in this instance plays audio content based on audio information by using remote playback timing and remote clock timing.

To play an individual frame (or packet) of the audio content in synchrony with every other playback device tasked with playing audio content in the playback group, the receiving playback device (i) receives the frames (or packets) comprising the portions of the audio content, (ii) receives the playback timing for the audio content (e.g., in the frame and/or packet headers of the frames and/or packets comprising the portions of the audio content or perhaps separately from the frames and/or packets comprising the portions of the audio content), (iii) receives the clock timing, and (iv) plays the portion(s) of the audio content in the individual frame (or packet) when the local clock that the receiving playback device uses for audio content playback reaches the playback time specified in the playback timing for that individual frame (or packet), as adjusted by a "timing offset."

In operation, after the receiving playback device receives clock timing, the receiving playback device determines a "timing offset" for the receiving playback device. This "timing offset" comprises (or at least corresponds to) a difference between the "reference" clock that was used to generate the clock timing and a "local" clock at the receiving playback device that the receiving playback device uses to play the audio content. In operation, each playback device that receives the clock timing from another device calculates its own "timing offset" based on the difference between its local clock and the clock timing, and thus, the "timing offset" that each playback device determines is specific to that particular playback device.

In some embodiments, when playing the audio content, the receiving playback device generates new playback timing (specific to the receiving playback device) for individual frames (or packets) of audio content by adding the previously determined "timing offset" to the playback timing for each received frame (or packet) comprising portions of audio content. With this approach, the receiving playback device converts the playback timing for the received audio content into "local" playback timing for the receiving playback device. Because each receiving playback device calculates its own "timing offset," each receiving playback device's determined "local" playback timing for an individual frame of audio content is specific to that particular playback device.

And when the "local" clock that the receiving playback device is using for playing back the audio content reaches the "local" playback time for an individual frame (or packet), the receiving playback device plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio content according to the playback timing as adjusted by the "timing offset" relative to the clock timing, and because the device providing the playback timing generated the playback timing for those frames (or packets) relative to the clock timing and (if applicable) plays the same frames (or packets) comprising portions of the audio content according to the playback timing and its determined "timing offset," the receiving playback device and the device that provided the playback timing (e.g., the group coordinator in some embodiments) play the same frames (or packets) comprising the same portions of the audio content in synchrony with each other, i.e., at the same time or at substantially the same time.

VI. Example Embodiments

The example embodiments described herein illustrate playback devices configured to, among other features, play audio content in a groupwise fashion using audio caching techniques.

FIGS. 7A and 7B show an example configuration of a media playback system 700 comprising several playback devices (shown as playback devices 702 and 704) configured for audio caching according to some embodiments. FIG. 7A illustrates a scenario where a particular audio track to be played by the playback devices 702 and 704 is not available in the local caches at playback devices 702 and 704, and FIG. 7B illustrates a scenario where the particular audio track to be played by the playback devices 702 and 704 is available in the local caches at playback devices 702 and 704.

The media playback system 700 includes playback device 702 and playback device 704. The playback devices 702 and 704 are configured to communicate with each other via the wireless local area network (WLAN) 708. Wireless router 706 is configured to provide the WLAN 708 via which the playback devices 702 and 704 communicate with each other and audio source 710 via the Internet 712.

Audio source 710 is connected to the Internet 712 via network link/connection 720, the wireless router 706 is connected to the Internet 712 via network link/connection 722 and to WLAN 708 via network link/connection 724. Playback device 702 is connected to WLAN 708 via network link 726, and playback device 704 is connected to WLAN 708 via network link/connection 728. The network/link connections are shown for illustrative purposes and may correspond to any type of wired and/or wireless network links/connections now known or later developed that are sufficient for facilitating data transmission between and among network devices.

Playback device 702 and playback device 704 are the same as or similar to any of the playback devices disclosed and described herein.

In the example scenario illustrated in FIGS. 7A and 7B, playback device 702 and playback device 704 are configured in a playback group where playback device 702 is configured as the group coordinator for the playback group and playback device 704 is configured as the group member for the playback group.

When a user requests playback of a particular audio track, the playback device 702 determines whether the particular audio track is already stored in its local cache (the local cache at playback device 702). If the particular audio track is stored in its local cache, playback device 702 then determines whether the particular audio track is also stored in playback device 704's local cache. In some embodiments, all of the playback devices in a playback group maintain the same set of audio tracks in their local caches. So in such embodiments, if the particular audio track is already stored in playback device 702's local cache, then the particular audio track should also be stored in playback device 704's local cache as well. However, there could be scenarios where the contents of playback device 704's cache might not be identical to the contents of playback device 702's cache (e.g., a scheduled cache update has not yet occurred or a cache update is in progress but not completed).

In some embodiments, if the particular audio track is not already stored in the playback device 702's local cache, playback device 702 may check to see whether playback device 704's local cache already has a copy of the particular audio track.

In the scenario illustrated in FIG. 7A, the particular audio track is not stored in playback device 702's local cache. So, playback device 702 (as the group coordinator) obtains the particular audio track from the audio source 710. The audio source 710 may be any Internet-accessible audio source disclosed and/or described herein or any other network-accessible audio source now known or later developed. For example, the audio source 710 may correspond to streaming media services such as SPOTIFY, PANDORA, APPLE MUSIC, etc.

The arrows along path 750 show the route that the stream of packets (indicated by the heavy dashed line) comprising the particular audio track takes from the audio source 710 to the playback device 702. In particular, the stream of packets comprising the particular audio track originate at audio source 710, traverse the Internet 712 to arrive at wireless router 708, which forwards the stream of packets to playback device 702 via WLAN 708. Playback device 702 processes the incoming stream of packets comprising the particular audio track in the manner described herein, e.g., extracting the audio content from the stream, generating playback timing for the extracted audio content, and generating a series of frames comprising the extracted audio content and playback timing.

Playback device 702 then distributes the series of frames comprising the audio content and playback timing to the group members, which in FIG. 7A includes playback device 704. Other scenarios may include more group members.

The arrows along path 752 show the route via which the series of frames comprising the audio content (indicated by the heavy dashed line) and playback timing (indicated by the light dashed line) take from playback device 702 to playback device 704. In particular, the series of frames comprising the audio content (for the particular audio track) and the playback timing originate at playback device 702, traverse the WLAN 708 to arrive at wireless router 706, and the wireless router 706 forwards the series of frames to playback device 704 via WLAN 708.

In operation, playback device 702 and playback device 704 use the playback timing to play the framed version of the particular audio track in a groupwise fashion according to any of the groupwise playback methods disclosed and/or described herein.

After the playback device 702 has obtained the particular audio track and created the framed version, the playback device 702 also stores at least the framed version of the particular audio track in its local cache for potential future playback. Similarly, after playback device 704 has received the framed version of the particular audio track from playback device 702, playback device 704 also stores at least the framed version of that particular audio track in its local cache for potential future playback. In operation, the framed version of the particular audio track is organized so that playback device 702 and playback device 704 can play the framed version of the particular audio track in the future based on playback timing that is later generated by playback device 702 and transmitted to playback device 704 and/or any other playback devices that may later join the playback group.

FIG. 7B illustrates a scenario where the playback group comprising playback device 702 and playback device 704 uses later-created playback timing to play a previously-stored framed version of an audio track in a groupwise fashion.

After a user has requested playback of the particular audio track, playback device 702 checks its local cache to determine whether the previously-framed version of the particular audio track is still stored in the local cache. After confirming that the previously-framed version of the particular audio track is still stored in its local cache, playback device 702 knows that it does not need to obtain the particular track from audio source 710.

Playback device 702 next determines whether the previously-framed version of the particular audio track is also still stored in playback device 704's local cache. If the previously-framed version of the particular audio track was not still stored in playback device 704's local cache for some reason, then playback device 702 generates playback timing for the previously-framed version of the particular audio track, and transmits the previously-framed version of the particular audio track and the playback timing to playback device 704.

But if the previously-framed version of the particular audio track is still stored in playback device 704's local cache, then playback device 702 generates playback timing for the previously-framed version of the particular audio track, and transmits the playback timing (but not the previously-framed version of the particular audio track) to playback device 704. In operation, playback device 702 and playback device 704 use the later-generated playback timing to play the previously-framed version of the particular audio track in a groupwise fashion according to any of the groupwise playback methods disclosed and/or described herein.

Because the individual playback devices 702 and 704 in the playback group maintain copies of previously-framed versions of audio tracks in their local caches, the playback devices 702 and 704 can play those previously-framed versions of audio tracks in a groupwise fashion without having to resend the audio content across the WLAN 708, which conserves both transmission bandwidth on the WLAN 708 and routing resources at wireless router 706 as compared to typical approaches where audio content is streamed across the WLAN 708 each time the audio track is played by the playback group.

The playback devices can maintain their local caches of previously-framed audio tracks in several ways. In some embodiments, the group coordinator for a playback group maintains a set of previously-framed audio tracks in its local cache. And when a new group member joins the playback group, the group coordinator transmits its set of previously-framed audio tracks to the new group member, and the new group member stores the same set of previously-framed audio tracks in its local cache. In some embodiments, if the new group member does not have enough memory to accommodate all of the previously-framed audio tracks stored in the group coordinator's local cache, the new group member may instead store some subset of all of the previously-framed audio tracks in its local cache.

For example, the new group member may store the previously-framed audio tracks that were most recently played and not store previously-framed audio tracks that have not been played recently, e.g., storing the previously-framed audio tracks that have been played within the last day (or some other time frame), but not store the previously-framed audio tracks that have been played more than a day ago (or some other time frame). Additionally or alternatively, the new group member may store the previously-framed audio tracks that have been played most often and not store previously-framed audio tracks that have not been played as often, e.g., storing the previously-framed audio tracks that have been played more than a threshold number of times, but not store the previously-framed audio tracks that have been played less than the threshold number of times.

Additionally, in some embodiments, when the group coordinator leaves a playback group and joins a new playback group as a new group member, the playback device updates its local cache to include the previously-framed versions of the audio tracks stored in the group coordinator's (of the new playback group) local cache. And if the playback device cannot accommodate all of the previously-framed versions of audio tracks stored in the new group coordinator's local cache, the playback device can store some subset of the previously-framed audio tracks based on how often and/or how recently each of the previously-framed audio tracks have been played as described above.

In some embodiments, the playback devices periodically (e.g., every day, week, month, etc.) and/or based on some event (e.g., after detecting too many cache misses in a period of time) compile a list of the most frequently played audio tracks and select the top n number of tracks to store in their local caches based on the memory allocation in the playback device (e.g., newer products have significantly more memory capacity than older products).

In some embodiments, all the playback devices in a household system maintain a common cache so that each playback device in the household system have the same previously-framed audio tracks. Alternatively, some playback devices with smaller memories can cache all of the top songs that they are able to store (e.g., a newer player may cache the top 20 songs while an older player may only cache the top 5). In some embodiments, the cache is implemented in the playback device's volatile memory (e.g., RAM) to avoid frequent write operations to the flash as the contents of the cache are updated over time.

Because users can create an arbitrary playback group of playback devices at any time, the playback devices in some embodiments are configured to replicate lists of the top audio tracks (e.g., most often played, most recently played, etc.) and a list of the previously-framed audio tracks cached locally on the playback device to all the other playback devices (e.g., via an .xml file or similar). In some embodiments, the list of top audio tracks and/or list of locally-cached previously-framed audio tracks can be shared along with other playback device state information that is typically stored and replicated between playback devices and controller devices.

Further, this list of top audio tracks and/or list of locally-cached previously-framed audio tracks may be replicated to a new playback device that is added to a household group while configuring the new playback device and adding it to the household group during initial installation and setup. Because the data is replicated between and among the playback devices in the household, any playback device in the household can refer to the file (e.g., an .xml file or similar) to see which other playback devices already have a particular previously-framed audio track cached when the playback device is selected as a group coordinator for an a new playback group.

In some embodiments, the list of the audio tracks to cache (and/or the top audio tracks) may be stored in flash memory at a playback device (instead of RAM) so that the list is maintained through a power cycle operation. After completion of a power cycle operation, the player may, in certain instances where the audio tracks themselves are not maintained through a power cycle, proceed to obtain copies of all of the tracks included in the list of audio tracks to cache (e.g., from other players, from Internet-accessible streaming services, etc.).

In some embodiments, individual playback devices may update their local caches during opportune times of the day to avoid interrupting other network devices by flooding the network with traffic to obtain a set of previously-framed audio tracks and/or distribute set of previously-framed audio tracks across several other playback devices. For example, playback devices are configured to update their caches at a time of day when there is little network traffic (e.g., in the middle of the night).

Additionally, in some embodiments, rather than updating the cache to add a previously-framed audio track, playback devices are configured to retain a copy of the framed audio track the next time the audio track is played. For example, individual playback devices in some embodiments maintain a list of audio tracks that, when played, should be retained as part of the local cache. New playback devices that are added to a household system can download the framed audio tracks to their caches (e.g., from another playback device) during the setup process.

In some embodiments, the previously-framed audio tracks can be compressed to reduce the file size stored in the playback device's cache (e.g., using lossless compression). Because the previously-framed audio track does not need to be streamed to the playback device during playback and, instead, is more analogous to a file archival/storage application, typical compression constraints that exist for streamed audio are not a concern. Accordingly, playback devices can use a much wider range of compression techniques. In some embodiments that compress the framed audio tracks for caching, the playback device may be configured to compress certain audio formats but not others. For example, it may not be worth compressing an already efficient mp3 audio track, but a high-resolution audio track may benefit from being compressed before storage in the cache.

VII. Example Methods

Figure 8:
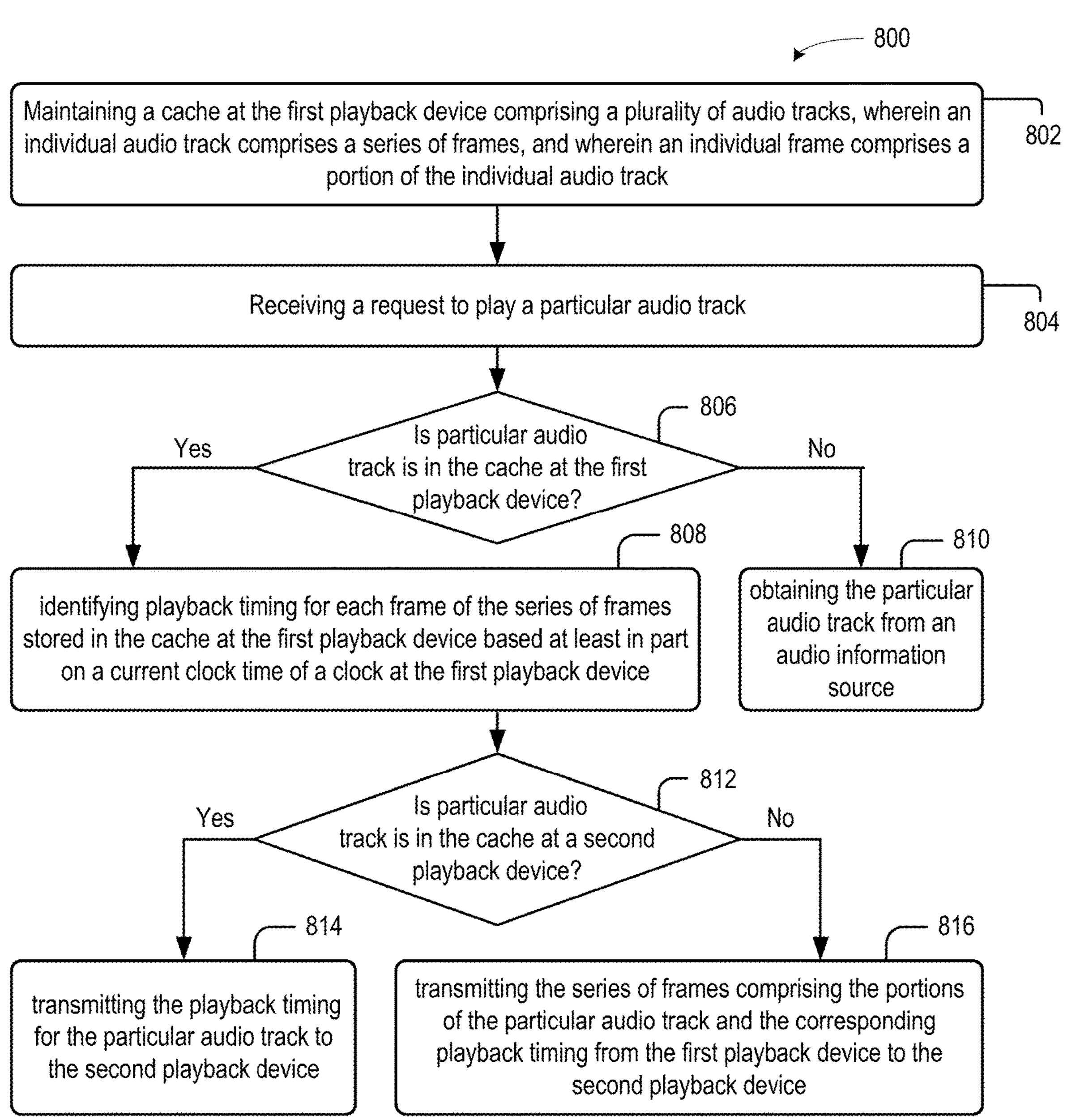
FIG. 8 shows an example method for using audio caching in connection with groupwise playback according to some embodiments.

FIG. 8 shows an example method 800 performed by a playback device according to some embodiments. For example, method 800 may be performed by any of the playback devices disclosed and/or described herein, including but not limited to playback devices 702 and 704 in FIGS. 7A and 7B.

Method 800 begins at block 802, which includes a first playback maintaining a cache at the first playback device comprising a plurality of audio tracks, wherein an individual audio track comprises a series of frames, and wherein an individual frame comprises a portion of the individual audio track. In some embodiments, individual frames further comprise a field (or similar portion) for indicating playback timing for the individual frame. In some embodiments, the playback timing is configurable by the first playback device. For example, in some embodiments, the individual frames comprise fields into which the first playback device can insert playback timing that the first playback device determines itself based on its local clock either individually or in combination with playback timing received from another device (e.g., another playback device, a controller, or the like).

In some embodiments, maintaining the cache at the first playback device comprising the plurality of audio tracks at block 802 includes limiting a number of audio tracks in the plurality of audio tracks to be less than a maximum number of audio tracks capable of being stored by a smaller of (i) a total number of audio tracks capable of being stored by the cache at the first playback device or (ii) a total number of audio tracks capable of being stored by a cache at one or more other playback devices in a network of playback devices comprising the first playback device. In this way, block 802 includes maintaining the cache at the first playback device such that the cache at the first playback device and the corresponding cache at each of the one or more other playback devices contain the same plurality of audio tracks.

In some embodiments where the first playback device and the second playback device are in a playback group, maintaining the cache at the first playback device comprising the plurality of audio tracks at block 802 includes limiting the number of audio tracks in the plurality of audio tracks to be less than the maximum number of audio tracks capable of being stored by the smaller of (i) the total number of audio tracks capable of being stored by the cache at the first playback device or (ii) the total number of audio tracks capable of being stored by the cache at the second playback device.

In some embodiments where the first playback device and the second playback device are in a playback group, maintaining the cache at the first playback device comprising the plurality of audio tracks at block 802 includes maintaining the cache at the first playback device comprising the plurality of audio tracks such that the cache at the first playback device and the cache at the second playback device contain the same plurality of audio tracks. In some embodiments, maintaining the cache at the first playback device comprising the plurality of audio tracks such that the cache at the first playback device and the cache at the second playback device contain the same plurality of audio tracks includes updating the cache at the first playback device such that the cache at the first playback device and the cache at the second playback device contain the same plurality of audio tracks. In some embodiments, the cache updating is performed during a time period when network traffic on the network via which the first playback device and the second playback device are configured to communicate with each other is less than a threshold amount of network traffic. For example, the first and/or second playback devices can be configured to monitor network traffic load (e.g., by querying their local router) and perform cache updates during times when the network traffic load is less than some threshold amount.

In some embodiments, the cache updating process additionally includes updating caches at new playback devices that are added to a playback group. For example, when a third playback device joins the playback group as a group member (or is otherwise added to the playback group), the cache updating process additionally includes (i) the first playback device transmitting the plurality of audio tracks stored in the cache at the first playback device to the third playback device for storage in a cache at the third playback device, and (ii) the third playback device receiving the plurality of audio tracks from the first playback device and storing the received plurality of tracks in the cache at the third playback device.

Next, method 800 advances to block 804, which includes receiving a request to play a particular audio track. In operation, the request to play the particular audio track may include a request received from a controller device configured to control a system of one or more playback devices comprising the first playback device. In some embodiments, the request may correspond to any of (i) a request to play the particular audio track, (ii) a request to play an album, playlist, or other compilation comprising the particular audio track, and/or (iii) a request to play tracks by a particular artist or within a particular genre, etc., whereupon playback of the tracks by the artist/genre includes playback of the particular track.

Next method 800 advances to block 806, which includes determining whether the particular audio track is in the cache at the first playback device. In operation, determining whether the particular audio track is in the cache at the first playback device includes the first playback device querying the contents of its cache to determine whether the particular audio track is contained in its cache When the particular audio track is in the cache at the first playback device at block 806, then method 800 advances to block 808 which includes identifying playback timing for each frame of the series of frames stored in the cache at the first playback device based at least in part on a current clock time of a clock at the first playback device. In some embodiments, identifying playback timing for each frame of the series of frames stored in the cache at the first playback device based at least in part on the current clock time of the clock at the first playback device at block 808 includes configuring playback timing for each frame of the series of frames stored in the cache at the first playback device based at least in part on the current clock time of the clock at the first playback device and, for each frame of audio, adding the configured playback time for that frame of audio to a particular field within the frame. In some embodiments, the playback time for the individual frame indicates a future time relative to the current clock time of the clock at the first playback device.

In some embodiments, block 808 additionally includes playing individual frames in the series of frames comprising the portions of the particular audio track according to the playback timing for the individual frames. In some scenarios where the first playback device plays the particular audio track from the cache rather than streaming the audio track from an Internet-accessible audio information source (e.g., SPOTIFY, APPLE MUSIC, AMAZON MUSIC, GOOGLE PLAY, etc.), the first playback device additionally causes an audio information source from where the particular audio track was originally obtained to be notified that the particular audio track has been played.

For example, if the particular audio track stored in the cache was originally obtained from SPOTIFY, then the first playback device (individually or in combination with one or more other playback devices and/or controller devices) causes a notification to be sent to SPOTIFY to inform SPOTIFY that the particular audio track that was originally obtained from SPOTIFY is being played locally. This notification may include one or more playback metrics, such as which portions of the particular audio track were played, whether the particular audio track was paused and/or restarted during playback, whether the particular audio track was skipped, and/or how much of the particular audio track was played.

In some embodiments, one or more playback devices (individually or in combination with a controller device) are configured to notify (or cause transmission of a notification to) the audio information source that the particular audio track has been played based on one or more playback metrics. For example, in some embodiments, the notification is transmitted only after the playback time of the particular audio track played from the cache exceeds some predefined playback time, e.g., 10 seconds, 15 seconds, 20 seconds, and so on.

When the particular audio track is not in the cache at the first playback device at block 806, then method 800 advances to block 810 which includes obtaining the particular audio track from an audio information source. In some embodiments, obtaining the particular audio track from an audio information source includes requesting the particular audio track from an Internet-accessible audio information source, e.g., SPOTIFY, APPLE MUSIC, etc.

As mentioned earlier, in some embodiments, the first playback device is configured as a group coordinator for a playback group comprising the first playback device and a second playback device. When configured as a group coordinator, the first playback device is configured to perform any (or all) of the group coordinator functions disclosed and described herein.

Some embodiments where the first playback device is configured as a group coordinator for a playback group comprising the first playback device and the second playback device additionally include, after obtaining the particular audio track from the audio information source at block 810, (i) generating a series of frames for the particular audio track obtained from the Internet-accessible audio information source, where an individual frame comprises a portion of the particular audio track obtained from the Internet-accessible audio information source and corresponding playback timing for the individual frame, and where the corresponding playback timing for the individual frame is indicative of a future time relative to the current clock time of the clock at the first playback device; (ii) transmitting the series of frames comprising the portions of the particular audio track and corresponding playback timing from the first playback device to the second playback device; and (iii) based on the playback timing for the individual frames and the clock at the first playback device, playing the individual frames of the particular audio track in synchrony with the second playback device's playing of the individual frames of the particular audio track transmitted from the first playback device to the second playback device.

In some embodiments where the first playback device is configured as a group coordinator for a playback group comprising the first playback device and a second playback device (and the particular audio track is in the cache at the first playback device), method 800 additionally includes step 812, which includes determining whether the particular audio track is stored in the cache at the second playback device.

When the particular audio track is in the cache at the second playback device at block 812, then method 800 advances to block 814 which includes transmitting the playback timing for the particular audio track to the second playback device. Because the particular audio track is stored in the cache at the second playback device, the first playback device does not need to send frames comprising the portions of the particular audio track to the second playback device. By the sending the playback timing for the individual frames of the particular audio track to the second playback device (but not sending the actual frames of audio content for the particular audio track), the first playback device transmits less data over the wireless network to the second playback device to facilitate synchronous playback by the first and second playback devices as compared to approaches where the first playback device sends frames comprising audio content and playback timing for the audio content to the second playback device to facilitate synchronous playback of the particular audio track by the first and second playback devices.

When the particular audio track is not in the cache at the second playback device at block 812, then method 800 advances to block 816 which includes transmitting the series of frames comprising the portions of the particular audio track and the corresponding playback timing from the first playback device to the second playback device in the ordinary course.

In some embodiments, rather than functioning as the group coordinator for a playback group (e.g., a playback group comprising the first and second playback devices), the first playback device is configured as a group member of the playback group and the second playback device is configured as the group coordinator for the playback group. Because the second playback device in these embodiments is configured as the group coordinator for the playback group, the second playback device is additionally configured to provide the particular audio track to the first playback device. In such embodiments, the block 810 step of obtaining the particular audio track from the audio information source includes the first playback device obtaining the particular audio track from the second playback device. In such embodiments, the second playback device may (i) transmit the particular audio track to the first playback device from a local cache at the second playback device and/or (ii) obtain the particular audio track from the audio information source, process the particular audio track to add playback timing, and then transmit the audio content and playback timing for the particular audio track to the first playback device.

In some embodiments where the first playback device is configured as a group member of the playback group and the second playback device is configured as the group coordinator for the playback group, the block 808 step of identifying and/or configuring playback timing for each frame of the series of frames stored in the cache at the first playback device based at least in part on the current clock time of the clock at the first playback device includes, for an individual frame of the particular audio track stored in the cache at the first playback device, configuring updated playback timing for the individual frame based on (i) playback timing received from the second playback device, where the playback timing corresponds to the individual frame and (ii) a difference between a clock time of the clock at the first playback device and the clock time of the clock at the second playback device. In this scenario, because the particular audio track is already stored in the cache at the first playback device, the second playback device does not need to re-send the actual audio content for the particular audio track to the first playback device. Instead, the second playback device in this scenario sends the playback timing for the particular audio track to the first playback device, and the first playback device uses the playback timing received from the second playback device to play the particular audio track in a groupwise fashion (e.g. in synchrony) with playback of the particular audio track by the second playback device.

As mentioned previously, in some embodiments where the first playback device and the second playback device are configured to operate in the first playback group, the first playback group is configurable such that a third playback device can join the first playback group, after which the first playback group comprises the first playback device, the second playback device, and the third playback device. Similarly, while the first playback device and the second playback device are configured to operate in the first playback group, the first playback device can leave the first playback group and join a second playback group with a third playback device, after which (i) the first playback group comprises the second playback device and (ii) the second playback group comprises the first playback device and the third playback device.

Accordingly, in some embodiments, method 800 additionally includes, when the third playback device is added to the first playback group as a group member, the first playback device transmitting the plurality of audio tracks stored in the cache at the first playback device from the first playback device to the third playback device for storage in a cache at the third playback device.

Similarly, some embodiments of method 800 additionally include, when the first playback device is removed from the first playback group and added to a second playback group comprising the first playback device configured as a group member and the third playback device configured as a group coordinator, updating the cache at the first playback device such that the cache at the first playback device contains the same plurality of audio tracks in the cache at the third playback device. Updating the cache in this scenario includes the third playback device transmitting the plurality of audio tracks (or at least a portion thereof) stored in its cache to the first playback device, and the first playback device receiving the plurality of audio tracks from the third playback device and storing the received audio tracks in the cache at the first playback device. As explained above, each audio track stored in the third playback device's cache has already been organized into a series of frames, and the individual frames include a portion of audio content and a field to be populated with a playback time. So, when the first playback device needs to play a particular audio track in a groupwise fashion with the third playback device (and when that particular audio track is resident in the first playback device's cache), the third playback device need not resend the particular audio track to the first playback device. Instead, the third playback device can send the playback timing for the particular audio track to the first playback device, and the first playback device can use the playback timing received from the third playback device to play the frames of audio content for the particular audio track that are stored in the first playback device's cache.

VIII. Conclusions

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A first playback device comprising:

one or more processors;

tangible, non-transitory computer readable media; and program instructions stored in the tangible, non-transitory computer readable media, wherein the program instructions are executable by the one or more processors such that the first playback device is configured to:

maintain a cache at the first playback device comprising a plurality of audio tracks, wherein an individual audio track comprises a series of frames, and wherein an individual frame comprises a portion of the individual audio track;

after receiving a request to play a particular audio track, determine whether the particular audio track is stored in the cache at the first playback device;

when the particular audio track is stored in the cache at the first playback device, (i) identify playback timing for each frame of the series of frames stored in the cache at the first playback device based at least in part on a current clock time of a clock at the first playback device, and (ii) play individual frames in the series of frames comprising the portions of the particular audio track according to the playback timing for the individual frames;

when the particular audio track is not stored in the cache at the first playback device, obtain the particular audio track from an audio information source;

wherein when the first playback device is configured as a group coordinator for a playback group comprising the first playback device and a second playback device, and wherein the program instructions executable by the one or more processors such that the first playback device is configured to identify playback timing for each frame of the series of frames stored in the cache at the first playback device based at least in part on the current clock time of the clock at the first playback device comprise program instructions executable by the one or more processors such that the first playback device is configured to:

for an individual frame, configure a playback time that is indicative of a future time relative to the current clock time of the clock at the first playback device; and wherein when the particular audio track is stored in the cache at the first playback device, the program instructions comprise further program instructions executable by the one or more processors such that the first playback device is further configured to:

determine whether the particular audio track is stored in a cache at the second playback device;

when the particular audio track is stored in the cache at the second playback device, transmit the playback timing for the particular audio track to the second playback device; and when the particular audio track is not stored in the cache at the second playback device, transmit the series of frames comprising the portions of the particular audio track and the corresponding playback timing from the first playback device to the second playback device.

2. The first playback device of claim 1, wherein the program instructions executable by the one or more processors such that the first playback device is configured to play individual frames in the series of frames comprising the portions of the particular audio track according to the playback timing for the individual frames comprise program instructions executable by the one or more processors such that the first playback device is configured to (i) when the particular audio track is stored in the cache at the second playback device, play the individual frames of the particular audio track stored in the cache at the first playback device in synchrony with the individual frames of the particular audio track stored in the cache at the second playback device based on the playback timing for the individual frames and the clock at the first playback device, and (ii) when the particular audio track is not stored in the cache at the second playback device, play the individual frames of the particular audio track stored in the cache at the first playback device in synchrony with the individual frames of the particular audio track transmitted from the first playback device to the second playback device based on the playback timing for the individual frames and the clock at the first playback device.

3. The first playback device of claim 1, wherein the program instructions executable by the one or more processors such that the first playback device is configured to obtain the particular audio track from the audio information source comprises program instructions executable by the one or more processors such that the first playback device is configured to request the particular audio track from an Internet-accessible audio information source, and wherein the program instructions comprise further program instructions executable by the one or more processors such that the first playback device is further configured to:

generate a series of frames for the particular audio track obtained from the Internet-accessible audio information source, wherein an individual frame comprises a portion of the particular audio track obtained from the Internet-accessible audio information source and corresponding playback timing for the individual frame, and wherein the corresponding playback timing for the individual frame is indicative of a future time relative to the current clock time of the clock at the first playback device;

transmit the series of frames comprising the portions of the particular audio track and corresponding playback timing from the first playback device to the second playback device; and based on the playback timing for the individual frames and the clock at the first playback device, play the individual frames of the particular audio track in synchrony with the second playback device's playing of individual frames of the particular audio track transmitted from the first playback device to the second playback device.

4. The first playback device of claim 1, wherein when the first playback device is configured as a group member of the playback group comprising the first playback device and the second playback device, and wherein when the second playback device is configured as the group coordinator for the playback group, and wherein the program instructions executable by the one or more processors such that the first playback device is configured to identify playback timing for each frame of the series of frames stored in the cache at the first playback device based at least in part on a current clock time of a clock at the first playback device comprise program instructions executable by the one or more processors such that the first playback device is configured to:

for an individual frame of the particular audio track stored in the cache at the first playback device, configure updated playback timing for the individual frame based on (i) playback timing corresponding to the individual frame received from the second playback device and (ii) a difference between a clock time of a clock at the first playback device and a clock time of the clock at the second playback device.

5. The first playback device of claim 4, wherein the program instructions executable by the one or more processors such that the first playback device is configured to obtain the particular audio track from an audio information source comprise program instructions executable by the one or more processors such that the first playback device is configured to receive the particular audio track from the second playback device.

6. The first playback device of claim 1, wherein when the first playback device is in the playback group comprising the first playback device and the second playback device, and wherein the program instructions executable by the one or more processors such that the first playback device is configured to maintain the cache at the first playback device comprising the plurality of audio tracks comprise program instructions executable by the one or more processors such that the first playback device is configured to:

limit a number of audio tracks in the plurality of audio tracks to be less than a maximum number of audio tracks capable of being stored by a smaller of (i) a total number of audio tracks capable of being stored by the cache at the first playback device or (ii) a total number of audio tracks capable of being stored by the cache at the second playback device.

7. The first playback device of claim 1, wherein when the first playback device is in the playback group comprising the first playback device and the second playback device, and wherein the program instructions executable by the one or more processors such that the first playback device is configured to maintain the cache at the first playback device comprising the plurality of audio tracks comprise program instructions executable by the one or more processors such that the first playback device is configured to:

maintain the cache at the first playback device comprising the plurality of audio tracks such that the cache at the first playback device and the cache at the second playback device contain the same plurality of audio tracks.

8. The first playback device of claim 7, wherein the program instructions executable by the one or more processors such that the first playback device is configured to maintain the cache at the first playback device comprising the plurality of audio tracks such that the cache at the first playback device and the cache at the second playback device contain the same plurality of audio tracks comprise program instructions executable by the one or more processors such that the first playback device is configured to:

update the cache at the first playback device such that the cache at the first playback device and the cache at the second playback device contain the same plurality of audio tracks during a time period when network traffic on a network via which the first playback device and the second playback device are configured to communicate with each other is less than a threshold amount of network traffic on the network.

9. The first playback device of claim 1, wherein when the first playback device is configured as the group coordinator for the playback group comprising the first playback device and the second playback device, and wherein the program instructions executable by the one or more processors such that the first playback device is configured to maintain the cache at the first playback device comprising the plurality of audio tracks comprise program instructions executable by the one or more processors such that the first playback device is configured to:

when a third playback device is added to the playback group as a group member, transmit the plurality of audio tracks stored in the cache at the first playback device to the third playback device for storage in a cache at the third playback device; and when the first playback device is removed from the playback group and added to a new playback group comprising the first playback device and a third playback device, wherein when the third playback device is configured as a group coordinator of the new playback group and when the first playback device is configured as a group member of the new playback group, update the cache at the first playback device such that the cache at the first playback device contains the same plurality of audio tracks in the cache at the third playback device.

10. The first playback device of claim 1, wherein when the first playback device is a member of a system comprising the first playback device and one more additional playback devices, wherein each of the one or more additional playback devices comprises a corresponding cache, and wherein the program instructions executable by the one or more processors such that the first playback device is configured to maintain the cache at the first playback device comprising the plurality of audio tracks comprise program instructions executable by the one or more processors such that the first playback device is configured to:

maintain the cache at the first playback device such that the cache at the first playback device and the corresponding cache at each of the one or more additional playback devices contain the same plurality of audio tracks.

11. The first playback device of claim 1, wherein the program instructions executable by the one or more processors such that the first playback device is configured to when the particular audio track is stored in the cache at the first playback device, play individual frames in the series of frames comprising the portions of the particular audio track according to the playback timing for the individual frames comprise program instructions executable by the one or more processors such that the first playback device is configured to:

cause an audio information source from where the particular audio track was originally obtained to be notified that the particular audio track has been played.

12. Tangible, non-transitory computer readable media comprising program instructions stored therein, wherein the program instructions, when executed by one or more processors, cause a first playback device to perform functions comprising:

maintaining a cache at the first playback device comprising a plurality of audio tracks, wherein an individual audio track comprises a series of frames, and wherein an individual frame comprises a portion of the individual audio track;

after receiving a request to play a particular audio track, determining whether the particular audio track is stored in the cache at the first playback device;

when the particular audio track is stored in the cache at the first playback device, (i) identifying playback timing for each frame of the series of frames stored in the cache at the first playback device based at least in part on a current clock time of a clock at the first playback device, and (ii) playing individual frames in the series of frames comprising the portions of the particular audio track according to the playback timing for the individual frames;

when the particular audio track is not stored in the cache at the first playback device, obtaining the particular audio track from an audio information source;

wherein when the first playback device is configured as a group coordinator for a playback group comprising the first playback device and a second playback device, and wherein identifying playback timing for each frame of the series of frames stored in the cache at the first playback device based at least in part on the current clock time of the clock at the first playback device comprises:

for an individual frame, configuring a playback time that is indicative of a future time relative to the current clock time of the clock at the first playback device;

wherein when the particular audio track is stored in the cache at the first playback device, the functions further comprise:

determining whether the particular audio track is stored in a cache at the second playback device;

when the particular audio track is stored in the cache at the second playback device, transmitting the playback timing for the particular audio track to the second playback device; and when the particular audio track is not stored in the cache at the second playback device, transmitting the series of frames comprising the portions of the particular audio track and the corresponding playback timing from the first playback device to the second playback device.

13. The tangible, non-transitory computer-readable media of claim 12, wherein when the particular audio track is stored in the cache at the first playback device, the functions further comprise:

when the particular audio track is stored in the cache at the second playback device, and wherein playing individual frames in the series of frames comprising the portions of the particular audio track according to the playback timing for the individual frames comprises playing the individual frames of the particular audio track stored in the cache at the first playback device in synchrony with the individual frames of the particular audio track stored in the cache at the second playback device based on the playback timing for the individual frames and the clock at the first playback device; and when the particular audio track is not stored in the cache at the second playback device, and wherein playing individual frames in the series of frames comprising the portions of the particular audio track according to the playback timing for the individual frames comprises playing the individual frames of the particular audio track stored in the cache at the first playback device in synchrony with the individual frames of the particular audio track transmitted from the first playback device to the second playback device based on the playback timing for the individual frames and the clock at the first playback device.

14. The tangible, non-transitory computer-readable media of claim 13, wherein obtaining the particular audio track from an audio information source comprises requesting the particular audio track from an Internet-accessible audio information source, and wherein the functions further comprise:

generating a series of frames for the particular audio track obtained from the Internet-accessible audio information source, wherein an individual frame comprises a portion of the particular audio track obtained from the Internet-accessible audio information source and corresponding playback timing for the individual frame, and wherein the corresponding playback timing for the individual frame is indicative of a future time relative to the current clock time of the clock at the first playback device;

transmitting the series of frames comprising the portions of the particular audio track and corresponding playback timing from the first playback device to the second playback device; and based on the playback timing for the individual frames and the clock at the first playback device, playing the individual frames of the particular audio track in synchrony with the second playback device's playing of individual frames of the particular audio track transmitted from the first playback device to the second playback device.

15. The tangible, non-transitory computer-readable media of claim 12, wherein when the first playback device is in the playback group comprising the first playback device and the second playback device, and wherein maintaining a cache at the first playback device comprising a plurality of audio tracks comprises one of:

limiting a number of audio tracks in the plurality of audio tracks to be less than a maximum number of audio tracks capable of being stored by a smaller of (i) a total number of audio tracks capable of being stored by the cache at the first playback device or (ii) a total number of audio tracks capable of being stored by the cache at the second playback device;

maintaining the cache at the first playback device comprising the plurality of audio tracks such that the cache at the first playback device and the cache at the second playback device contain the same plurality of audio tracks; or updating the cache at the first playback device such that the cache at the first playback device and the cache at the second playback device contain the same plurality of audio tracks during a time period when network traffic on a network via which the first playback device and the second playback device are configured to communicate with each other is less than a threshold amount of network traffic on the network.

16. The tangible, non-transitory computer-readable media of claim 12, wherein when the particular audio track is stored in the cache at the first playback device, playing individual frames in the series of frames comprising the portions of the particular audio track according to the playback timing for the individual frames comprises:

causing an audio information source from where the particular audio track was originally obtained to be notified that the particular audio track has been played.

17. A method performed by a first playback device, wherein the method comprises:

maintaining a cache at the first playback device, wherein the cache comprises a plurality of audio tracks, wherein an individual audio track comprises a series of frames, and wherein an individual frame comprises a portion of the individual audio track;

after receiving a request to play a particular audio track, determining whether the particular audio track is stored in the cache at the first playback device;

when the particular audio track is stored in the cache at the first playback device, (i) identifying playback timing for each frame of the series of frames stored in the cache at the first playback device based at least in part on a current clock time of a clock at the first playback device, and (ii) playing individual frames in the series of frames comprising the portions of the particular audio track according to the playback timing for the individual frames;

when the particular audio track is not stored in the cache at the first playback device, obtaining the particular audio track from an audio information source;

wherein when the first playback device is configured as a group coordinator for a playback group comprising the first playback device and a second playback device, and wherein identifying playback timing for each frame of the series of frames stored in the cache at the first playback device based at least in part on the current clock time of the clock at the first playback device comprises:

for an individual frame, configuring a playback time that is indicative of a future time relative to the current clock time of the clock at the first playback device;

wherein when the particular audio track is stored in the cache at the first playback device, the functions further comprise:

determining whether the particular audio track is stored in a cache at the second playback device;

when the particular audio track is stored in the cache at the second playback device, transmitting the playback timing for the particular audio track to the second playback device; and when the particular audio track is not stored in the cache at the second playback device, transmitting the series of frames comprising the portions of the particular audio track and the corresponding playback timing from the first playback device to the second playback device.

* * * * *